(12) United States Patent
Cuddy et al.

(10) Patent No.: US 9,047,733 B2
(45) Date of Patent: Jun. 2, 2015

(54) GAMING SYSTEM AND METHOD FOR PROVIDING MULTIPLE LEVEL PROGRESSIVE AWARDS WITH INCREASED ODDS OF WINNING HIGHER LEVEL PROGRESSIVE AWARDS

(75) Inventors: Ryan Cuddy, Reno, NV (US); Anthony J. Baerlocher, Reno, NV (US)

(73) Assignee: IGT, Las Vegas, NV (US)

( * ) Notice: Subject to any disclaimer, the term of this patent is extended or adjusted under 35 U.S.C. 154(b) by 2061 days.

(21) Appl. No.: 11/557,878

(22) Filed: Nov. 8, 2006

(65) Prior Publication Data

US 2008/0108431 A1    May 8, 2008

(51) Int. Cl.
*A63F 13/00* (2014.01)
*G07F 17/32* (2006.01)

(52) U.S. Cl.
CPC ................................. *G07F 17/3258* (2013.01)

(58) Field of Classification Search
CPC . G07F 17/32; G07F 17/3244; G07F 17/3258; G07F 17/326
USPC .............................................. 463/27, 25, 26
See application file for complete search history.

(56) References Cited

U.S. PATENT DOCUMENTS

| | | | |
|---|---|---|---|
| 2,942,574 A | 6/1960 | Golay | |
| 3,618,019 A | 11/1971 | Nemirovsky | |
| 3,998,309 A | 12/1976 | Mandas et al. | |
| 4,072,930 A | 2/1978 | Lucero et al. | |
| 4,238,127 A | 12/1980 | Lucero et al. | |
| 4,277,064 A | 7/1981 | Newman | |
| 4,283,709 A | 8/1981 | Lucero et al. | |
| 4,335,809 A | 6/1982 | Wain | |
| 4,409,656 A | 10/1983 | Andersen et al. | |
| 4,448,419 A | 5/1984 | Telnaes | |
| 4,494,197 A | 1/1985 | Troy et al. | |
| 4,573,681 A | 3/1986 | Okada | |

(Continued)

FOREIGN PATENT DOCUMENTS

| AU | 78/39363 | 3/1980 |
|---|---|---|
| AU | 81/66683 | 8/1981 |

(Continued)

OTHER PUBLICATIONS

"Letter from Mr. McClarnon regarding disclosure of U.S. Patent No. 6,409,602; dated Aug. 3, 2008."

(Continued)

*Primary Examiner* — Omkar Deodhar
*Assistant Examiner* — Allen Chan
(74) *Attorney, Agent, or Firm* — Neal, Gerber & Eisenberg LLP

(57) ABSTRACT

A gaming system including a central server linked to a plurality of gaming machines is provided. The gaming system includes a plurality of progressive awards arranged in a hierarchy. Upon the occurrence of a triggering event or qualifying condition, a bonus game is started. A player can win a next higher progressive award by accumulating award values. If the player's total award value is greater than or equal to a trigger value for a progressive award, the player wins the progressive award. Unless a termination condition occurs, the bonus game continues. The total award value is set to the progressive award value. Alternatively, the progressive award value is added to the player's total award value. The trigger value for a progressive award can be the startup value for that progressive award.

31 Claims, 20 Drawing Sheets

(56) References Cited

U.S. PATENT DOCUMENTS

| | | | |
|---|---|---|---|
| 4,582,324 | A | 4/1986 | Koza et al. |
| 4,624,459 | A | 11/1986 | Kaufman |
| 4,636,951 | A | 1/1987 | Harlick |
| 4,652,998 | A | 3/1987 | Koza et al. |
| 4,657,256 | A | 4/1987 | Okada |
| 4,669,731 | A | 6/1987 | Clarke |
| 4,721,307 | A | 1/1988 | Okada |
| 4,743,024 | A | 5/1988 | Helm et al. |
| 4,760,527 | A | 7/1988 | Sidley |
| 4,764,666 | A | 8/1988 | Bergeron |
| 4,772,023 | A | 9/1988 | Okada |
| 4,775,155 | A | 10/1988 | Lees |
| 4,805,907 | A | 2/1989 | Hagiwara |
| 4,837,728 | A | 6/1989 | Barrie et al. |
| 4,842,278 | A | 6/1989 | Markowicz |
| 4,856,787 | A | 8/1989 | Itkis |
| 4,871,171 | A | 10/1989 | Rivero |
| 4,880,237 | A | 11/1989 | Kishishita |
| 4,926,327 | A | 5/1990 | Sidley |
| 4,964,638 | A | 10/1990 | Ishida |
| 4,991,848 | A | 2/1991 | Greenwood et al. |
| 5,016,880 | A | 5/1991 | Berge |
| 5,038,022 | A | 8/1991 | Lucero |
| 5,048,833 | A | 9/1991 | Lamle |
| 5,074,559 | A | 12/1991 | Okada |
| 5,116,055 | A | 5/1992 | Tracy |
| 5,123,649 | A | 6/1992 | Tiberio |
| 5,127,651 | A | 7/1992 | Okada |
| 5,158,293 | A | 10/1992 | Mullins |
| 5,178,390 | A | 1/1993 | Okada |
| 5,209,479 | A | 5/1993 | Nagao |
| 5,217,224 | A | 6/1993 | Sincock |
| 5,249,800 | A | 10/1993 | Hilgendorf et al. |
| 5,259,616 | A | 11/1993 | Bergmann |
| 5,265,874 | A | 11/1993 | Dickinson et al. |
| 5,275,400 | A | 1/1994 | Weingardt |
| 5,276,312 | A | 1/1994 | McCarthy |
| 5,277,424 | A | 1/1994 | Wilms |
| 5,280,909 | A | 1/1994 | Tracy |
| 5,282,620 | A | 2/1994 | Keesee |
| 5,286,023 | A | 2/1994 | Wood |
| 5,292,127 | A | 3/1994 | Kelly et al. |
| 5,321,241 | A | 6/1994 | Craine |
| 5,324,035 | A | 6/1994 | Morris et al. |
| 5,326,104 | A | 7/1994 | Pease et al. |
| 5,342,047 | A | 8/1994 | Heidel et al. |
| 5,342,049 | A | 8/1994 | Wichinsky et al. |
| 5,344,144 | A | 9/1994 | Canon |
| 5,351,970 | A | 10/1994 | Fioretti |
| 5,377,993 | A | 1/1995 | Josephs |
| 5,380,008 | A | 1/1995 | Mathis et al. |
| 5,393,057 | A | 2/1995 | Marnell, II |
| 5,398,932 | A | 3/1995 | Eberhardt et al. |
| 5,401,024 | A | 3/1995 | Simunek |
| 5,417,430 | A | 5/1995 | Breeding |
| 5,423,539 | A | 6/1995 | Nagao |
| 5,429,361 | A | 7/1995 | Raven et al. |
| 5,456,465 | A | 10/1995 | Durham |
| 5,470,079 | A | 11/1995 | LeStrange et al. |
| 5,472,194 | A | 12/1995 | Breeding et al. |
| 5,476,259 | A | 12/1995 | Weingardt |
| 5,489,101 | A | 2/1996 | Moody |
| 5,507,489 | A | 4/1996 | Reibel et al. |
| 5,511,781 | A | 4/1996 | Wood |
| 5,524,888 | A | 6/1996 | Heidel |
| 5,536,016 | A | 7/1996 | Thompson |
| 5,544,893 | A | 8/1996 | Jones et al. |
| 5,547,192 | A | 8/1996 | Ishibashi |
| 5,560,603 | A | 10/1996 | Seelig et al. |
| 5,564,700 | A | 10/1996 | Celona |
| 5,566,337 | A | 10/1996 | Szymanski et al. |
| 5,570,885 | A | 11/1996 | Ornstein |
| 5,580,053 | A | 12/1996 | Crouch |
| 5,580,309 | A | 12/1996 | Piechowiak et al. |
| 5,581,011 | A | 12/1996 | Lott |
| 5,584,763 | A | 12/1996 | Kelly et al. |
| 5,601,487 | A | 2/1997 | Oshima et al. |
| 5,605,506 | A | 2/1997 | Hoorn et al. |
| 5,611,535 | A | 3/1997 | Tiberio |
| 5,611,730 | A | 3/1997 | Weiss |
| 5,626,341 | A | 5/1997 | Jones |
| 5,641,050 | A | 6/1997 | Smith et al. |
| 5,645,486 | A | 7/1997 | Nagao et al. |
| 5,655,961 | A | 8/1997 | Acres et al. |
| 5,674,128 | A | 10/1997 | Holch et al. |
| 5,702,304 | A | 12/1997 | Acres et al. |
| 5,707,285 | A | 1/1998 | Place et al. |
| 5,707,286 | A | 1/1998 | Carlson |
| 5,722,891 | A | 3/1998 | Inoue |
| 5,732,948 | A | 3/1998 | Yoseloff |
| 5,741,183 | A | 4/1998 | Acres et al. |
| 5,743,800 | A | 4/1998 | Huard et al. |
| 5,752,882 | A | 5/1998 | Acres et al. |
| 5,761,647 | A | 6/1998 | Boushy |
| 5,762,552 | A | 6/1998 | Vuong |
| 5,766,076 | A | 6/1998 | Pease et al. |
| 5,769,716 | A | 6/1998 | Saffari et al. |
| 5,772,511 | A | 6/1998 | Smeltzer |
| RE35,864 | E | 7/1998 | Weingardt |
| 5,779,545 | A | 7/1998 | Berg et al. |
| 5,779,547 | A | 7/1998 | SoRelle et al. |
| 5,779,549 | A | 7/1998 | Walker et al. |
| 5,788,573 | A | 8/1998 | Baerlocher et al. |
| 5,800,269 | A | 9/1998 | Holch et al. |
| 5,806,855 | A | 9/1998 | Cherry |
| 5,807,172 | A | 9/1998 | Piechowiak |
| 5,816,918 | A | 10/1998 | Kelly et al. |
| 5,820,459 | A | 10/1998 | Acres et al. |
| 5,823,874 | A | 10/1998 | Adams |
| 5,833,537 | A | 11/1998 | Barrie |
| 5,833,538 | A | 11/1998 | Weiss |
| 5,833,540 | A | 11/1998 | Miodunski et al. |
| 5,836,817 | A | 11/1998 | Acres et al. |
| 5,848,932 | A | 12/1998 | Adams |
| 5,851,011 | A | 12/1998 | Lott |
| 5,851,148 | A | 12/1998 | Brune et al. |
| 5,851,149 | A | 12/1998 | Xidos et al. |
| 5,855,514 | A | 1/1999 | Kamille |
| 5,855,515 | A | 1/1999 | Pease et al. |
| 5,876,284 | A | 3/1999 | Acres et al. |
| 5,885,158 | A | 3/1999 | Torango et al. |
| 5,902,184 | A | 5/1999 | Bennett |
| 5,902,983 | A | 5/1999 | Crevelt et al. |
| 5,910,048 | A | 6/1999 | Feinburg |
| 5,919,088 | A | 7/1999 | Weiss |
| 5,941,773 | A | 8/1999 | Harlick |
| 5,944,606 | A | 8/1999 | Gerow |
| 5,947,820 | A | 9/1999 | Morro et al. |
| 5,947,822 | A | 9/1999 | Weiss |
| 5,951,011 | A | 9/1999 | Potter et al. |
| 5,970,143 | A | 10/1999 | Schneier et al. |
| 5,980,384 | A | 11/1999 | Barrie |
| 5,984,779 | A | 11/1999 | Bridgeman et al. |
| 5,989,121 | A | 11/1999 | Sakamoto |
| 5,993,316 | A | 11/1999 | Coyle et al. |
| 5,997,400 | A | 12/1999 | Seelig et al. |
| 6,001,016 | A | 12/1999 | Walker et al. |
| 6,004,207 | A | 12/1999 | Wilson, Jr. et al. |
| 6,007,427 | A | 12/1999 | Wiener |
| 6,012,982 | A | 1/2000 | Piechowiak et al. |
| 6,012,983 | A | 1/2000 | Walker et al. |
| 6,015,346 | A | 1/2000 | Bennett |
| 6,030,288 | A | 2/2000 | Davis et al. |
| 6,039,648 | A | 3/2000 | Guinn et al. |
| 6,039,649 | A | 3/2000 | Schulze |
| 6,048,269 | A | 4/2000 | Burns et al. |
| 6,050,895 | A | 4/2000 | Luciano et al. |
| 6,056,642 | A | 5/2000 | Bennett |
| 6,059,289 | A | 5/2000 | Vancura |
| 6,068,553 | A | 5/2000 | Parker |
| 6,077,162 | A | 6/2000 | Weiss |
| 6,080,062 | A | 6/2000 | Olson |
| 6,089,976 | A | 7/2000 | Schneider et al. |
| 6,089,977 | A | 7/2000 | Bennett |

(56) References Cited

U.S. PATENT DOCUMENTS

| | | |
|---|---|---|
| 6,089,978 A | 7/2000 | Adams |
| 6,089,980 A | 7/2000 | Gauselmann |
| 6,099,408 A | 8/2000 | Schneier et al. |
| 6,110,041 A | 8/2000 | Walker et al. |
| 6,110,043 A | 8/2000 | Olsen |
| 6,117,013 A | 9/2000 | Eiba |
| 6,135,884 A | 10/2000 | Hedrick et al. |
| 6,142,872 A | 11/2000 | Walker et al. |
| 6,146,270 A | 11/2000 | Haurd et al. |
| 6,146,273 A | 11/2000 | Olsen |
| 6,149,521 A | 11/2000 | Sanduski |
| 6,152,823 A | 11/2000 | Lacoste et al. |
| 6,155,925 A | 12/2000 | Giobbi et al. |
| 6,159,097 A | 12/2000 | Gura |
| 6,159,098 A | 12/2000 | Slomiany et al. |
| 6,162,121 A | 12/2000 | Morro et al. |
| 6,162,122 A | 12/2000 | Acres et al. |
| 6,167,523 A | 12/2000 | Strong |
| 6,168,520 B1 | 1/2001 | Baerlocher et al. |
| 6,183,366 B1 | 2/2001 | Goldberg et al. |
| 6,186,894 B1 | 2/2001 | Mayeroff |
| 6,190,255 B1 | 2/2001 | Thomas et al. |
| 6,203,010 B1 | 3/2001 | Jorasch et al. |
| 6,203,430 B1 | 3/2001 | Walker et al. |
| 6,206,374 B1 | 3/2001 | Jones |
| 6,210,275 B1 | 4/2001 | Olsen |
| 6,210,277 B1 | 4/2001 | Stefan |
| 6,217,448 B1 | 4/2001 | Olsen |
| 6,224,482 B1 | 5/2001 | Bennett |
| 6,224,483 B1 | 5/2001 | Mayeroff |
| 6,224,484 B1 | 5/2001 | Okuda et al. |
| 6,231,442 B1 | 5/2001 | Mayeroff |
| 6,231,445 B1 | 5/2001 | Acres |
| 6,234,896 B1 | 5/2001 | Walker et al. |
| 6,238,288 B1 | 5/2001 | Walker et al. |
| 6,241,608 B1 | 6/2001 | Torango |
| 6,244,958 B1 | 6/2001 | Acres |
| 6,254,483 B1 | 7/2001 | Acres |
| 6,257,981 B1 | 7/2001 | Acres et al. |
| 6,264,557 B1 | 7/2001 | Schneier et al. |
| 6,270,409 B1 | 8/2001 | Shuster |
| 6,287,194 B1 | 9/2001 | Okada et al. |
| 6,287,202 B1 | 9/2001 | Pascal et al. |
| 6,293,866 B1 | 9/2001 | Walker et al. |
| RE37,414 E | 10/2001 | Harlick |
| 6,302,790 B1 | 10/2001 | Brossard |
| 6,302,793 B1 | 10/2001 | Fertitta, III et al. |
| 6,302,794 B1 | 10/2001 | Ogawa |
| 6,309,298 B1 | 10/2001 | Gerow |
| 6,309,300 B1 | 10/2001 | Glavich |
| 6,311,976 B1 | 11/2001 | Yoseloff et al. |
| 6,312,330 B1 | 11/2001 | Jones et al. |
| 6,312,333 B1 | 11/2001 | Acres |
| 6,315,662 B1 | 11/2001 | Jorasch et al. |
| 6,319,122 B1 | 11/2001 | Packes, Jr. et al. |
| 6,319,125 B1 | 11/2001 | Acres |
| 6,328,649 B1 | 12/2001 | Randall et al. |
| 6,334,814 B1 | 1/2002 | Adams |
| 6,336,857 B1 | 1/2002 | McBride |
| 6,340,158 B2 | 1/2002 | Preice et al. |
| 6,346,043 B1 | 2/2002 | Colin et al. |
| 6,347,738 B1 | 2/2002 | Crevelt et al. |
| 6,347,996 B1 | 2/2002 | Gilmore et al. |
| 6,358,147 B1 | 3/2002 | Jaffe et al. |
| 6,358,149 B1 | 3/2002 | Schneider et al. |
| 6,361,441 B1 | 3/2002 | Walker et al. |
| 6,364,766 B1 | 4/2002 | Anderson et al. |
| 6,364,768 B1 | 4/2002 | Acres et al. |
| 6,364,769 B1 | 4/2002 | Weiss et al. |
| 6,371,852 B1 | 4/2002 | Acres |
| 6,375,567 B1 | 4/2002 | Acres |
| 6,375,568 B1 | 4/2002 | Roffman et al. |
| 6,375,569 B1 | 4/2002 | Acres |
| 6,398,218 B1 | 6/2002 | Vancura |
| 6,406,369 B1 | 6/2002 | Baerlocher et al. |
| 6,409,602 B1 | 6/2002 | Wiltshire et al. |
| 6,416,408 B2 | 7/2002 | Tracy et al. |
| 6,416,409 B1 | 7/2002 | Jordan |
| 6,419,579 B1 | 7/2002 | Bennett |
| 6,419,583 B1 | 7/2002 | Crumby et al. |
| 6,428,412 B1 | 8/2002 | Anderson et al. |
| 6,431,983 B2 | 8/2002 | Acres |
| 6,435,511 B1 | 8/2002 | Vancura et al. |
| 6,435,968 B1 | 8/2002 | Torango |
| 6,454,651 B1 | 9/2002 | Yoseloff |
| RE37,885 E | 10/2002 | Acres et al. |
| 6,461,241 B1 | 10/2002 | Webb et al. |
| 6,471,208 B2 | 10/2002 | Yoseloff et al. |
| 6,481,713 B2 | 11/2002 | Perrie et al. |
| 6,511,376 B2 | 1/2003 | Walker et al. |
| 6,533,664 B1 | 3/2003 | Crumby |
| 6,537,150 B1 | 3/2003 | Luciano et al. |
| 6,546,134 B1 | 4/2003 | Shrairman et al. |
| 6,546,374 B1 | 4/2003 | Esposito et al. |
| 6,547,131 B1 | 4/2003 | Foodman et al. |
| 6,554,705 B1 | 4/2003 | Cumbers |
| 6,561,904 B2 | 5/2003 | Locke et al. |
| 6,565,434 B1 | 5/2003 | Acres |
| 6,569,015 B1 | 5/2003 | Baerlocher et al. |
| 6,572,471 B1 | 6/2003 | Bennett |
| 6,575,832 B1 | 6/2003 | Manfredi et al. |
| 6,589,115 B2 | 7/2003 | Walker et al. |
| 6,592,460 B2 | 7/2003 | Torango |
| 6,595,853 B1 | 7/2003 | Osawa |
| 6,599,185 B1 | 7/2003 | Kaminkow et al. |
| 6,599,190 B2 | 7/2003 | Osawa |
| 6,599,193 B2 | 7/2003 | Baerlocher et al. |
| 6,607,438 B2 | 8/2003 | Baerlocher et al. |
| 6,607,441 B1 | 8/2003 | Acres |
| 6,609,973 B1 | 8/2003 | Weiss |
| 6,620,046 B2 | 9/2003 | Rowe |
| 6,626,758 B1 | 9/2003 | Parham et al. |
| 6,634,944 B2 | 10/2003 | Osawa |
| 6,637,747 B1 | 10/2003 | Garrod |
| 6,645,074 B2 | 11/2003 | Thomas et al. |
| 6,645,077 B2 | 11/2003 | Rowe |
| 6,648,759 B2 | 11/2003 | Vancura |
| 6,648,762 B2 | 11/2003 | Walker et al. |
| 6,656,047 B1 | 12/2003 | Tarantino et al. |
| 6,656,048 B2 | 12/2003 | Olsen |
| 6,656,052 B2 | 12/2003 | Abramopoulos et al. |
| 6,672,959 B2 | 1/2004 | Moody et al. |
| 6,675,152 B1 | 1/2004 | Prasad et al. |
| 6,682,419 B2 | 1/2004 | Webb et al. |
| 6,682,420 B2 | 1/2004 | Webb et al. |
| 6,682,421 B1 | 1/2004 | Rowe et al. |
| 6,692,355 B2 | 2/2004 | Baerlocher et al. |
| 6,702,674 B1 | 3/2004 | De Bruin et al. |
| 6,712,695 B2 | 3/2004 | Mothwurf et al. |
| 6,712,697 B2 | 3/2004 | Acres |
| 6,719,630 B1 | 4/2004 | Seelig et al. |
| 6,733,389 B2 | 5/2004 | Webb et al. |
| 6,746,328 B2 | 6/2004 | Cannon et al. |
| 6,749,510 B2 | 6/2004 | Giobbi |
| 6,754,346 B2 | 6/2004 | Eiserling et al. |
| 6,761,632 B2 | 7/2004 | Bansemer et al. |
| 6,776,714 B2 | 8/2004 | Ungaro et al. |
| 6,776,715 B2 | 8/2004 | Price |
| 6,780,111 B2 | 8/2004 | Cannon et al. |
| 6,790,141 B2 | 9/2004 | Muir |
| 6,793,578 B2 | 9/2004 | Baerlocher et al. |
| 6,800,030 B2 | 10/2004 | Acres |
| 6,805,352 B2 | 10/2004 | Hunter |
| 6,811,483 B1 | 11/2004 | Webb et al. |
| 6,832,956 B1 | 12/2004 | Boyd et al. |
| 6,832,958 B2 | 12/2004 | Acres et al. |
| 6,837,788 B2 | 1/2005 | Cannon |
| 6,857,958 B2 | 2/2005 | Osawa |
| 6,869,361 B2 | 3/2005 | Sharpless et al. |
| 6,887,154 B1 | 5/2005 | Luciano, Jr. et al. |
| 6,889,849 B2 | 5/2005 | Heidel et al. |
| 6,899,625 B2 | 5/2005 | Luciano, Jr. et al. |
| 6,908,387 B2 | 6/2005 | Hedrick et al. |
| 6,910,964 B2 | 6/2005 | Acres |

(56) References Cited

U.S. PATENT DOCUMENTS

| | | | |
|---|---|---|---|
| 6,918,832 B2 | 7/2005 | Baerlocher et al. | |
| 6,918,834 B2 | 7/2005 | Vancura | |
| 6,932,707 B2 | 8/2005 | Duhamel | |
| 6,935,951 B2 | 8/2005 | Paulsen et al. | |
| 6,935,958 B2 | 8/2005 | Nelson | |
| 6,939,234 B2 | 9/2005 | Beatty | |
| RE38,812 E | 10/2005 | Acres et al. | |
| 6,966,834 B1 | 11/2005 | Johnson | |
| 6,981,917 B2 | 1/2006 | Webb et al. | |
| 6,984,173 B1 | 1/2006 | Piechowiak et al. | |
| 7,029,395 B1 | 4/2006 | Baerlocher | |
| 7,037,195 B2 | 5/2006 | Schneider et al. | |
| 7,056,215 B1 | 6/2006 | Olive | |
| 7,059,965 B2 * | 6/2006 | Jackson | 463/16 |
| 7,204,756 B2 | 4/2007 | Jubinville et al. | |
| 2001/0024971 A1 | 9/2001 | Brossard | |
| 2001/0049303 A1 | 12/2001 | Found et al. | |
| 2001/0055990 A1 | 12/2001 | Acres | |
| 2002/0002674 A1 | 1/2002 | Grimes et al. | |
| 2002/0071557 A1 | 6/2002 | Nguyen | |
| 2002/0116615 A1 | 8/2002 | Nguyen et al. | |
| 2002/0138594 A1 | 9/2002 | Rowe | |
| 2002/0152120 A1 | 10/2002 | Howington | |
| 2002/0165023 A1 | 11/2002 | Brosnan et al. | |
| 2002/0187834 A1 | 12/2002 | Rowe et al. | |
| 2003/0027625 A1 | 2/2003 | Rowe | |
| 2003/0027630 A1 | 2/2003 | Kelly et al. | |
| 2003/0028779 A1 | 2/2003 | Rowe | |
| 2003/0045350 A1 | 3/2003 | Baerlocher et al. | |
| 2003/0045353 A1 | 3/2003 | Paulsen et al. | |
| 2003/0050111 A1 | 3/2003 | Saffari | |
| 2003/0054878 A1 | 3/2003 | Benoy et al. | |
| 2003/0060266 A1 | 3/2003 | Baerlocher | |
| 2003/0060269 A1 | 3/2003 | Paulsen et al. | |
| 2003/0060279 A1 | 3/2003 | Torango | |
| 2003/0083943 A1 | 5/2003 | Adams et al. | |
| 2003/0092484 A1 | 5/2003 | Schneider et al. | |
| 2003/0100361 A1 | 5/2003 | Sharpless et al. | |
| 2003/0144965 A1 | 7/2003 | Prasad et al. | |
| 2003/0182574 A1 | 9/2003 | Whitten et al. | |
| 2003/0199321 A1 | 10/2003 | Williams | |
| 2003/0211879 A1 | 11/2003 | Englman | |
| 2003/0222402 A1 | 12/2003 | Olive | |
| 2003/0223803 A1 | 12/2003 | De Schrijver | |
| 2003/0228904 A1 | 12/2003 | Acres et al. | |
| 2003/0232647 A1 | 12/2003 | Moser | |
| 2004/0009811 A1 | 1/2004 | Torango | |
| 2004/0038729 A1 * | 2/2004 | Webb et al. | 463/20 |
| 2004/0072615 A1 | 4/2004 | Maya et al. | |
| 2004/0077408 A1 * | 4/2004 | D'Amico et al. | 463/42 |
| 2004/0087368 A1 | 5/2004 | Gauselmann | |
| 2004/0219962 A1 | 11/2004 | Vancura | |
| 2004/0242297 A1 | 12/2004 | Walker | |
| 2005/0012818 A1 | 1/2005 | Kiely et al. | |
| 2005/0026694 A1 | 2/2005 | Kelly et al. | |
| 2005/0032573 A1 | 2/2005 | Acres et al. | |
| 2005/0053467 A1 | 3/2005 | Ackerman et al. | |
| 2005/0055115 A1 | 3/2005 | Gerrard et al. | |
| 2005/0070353 A1 | 3/2005 | Webb et al. | |
| 2005/0070356 A1 | 3/2005 | Mothwurf | |
| 2005/0079908 A1 | 4/2005 | Pacey | |
| 2005/0079911 A1 | 4/2005 | Nakatsu | |
| 2005/0086478 A1 | 4/2005 | Peinado et al. | |
| 2005/0096125 A1 | 5/2005 | LeMay et al. | |
| 2005/0101374 A1 | 5/2005 | Acres | |
| 2005/0101375 A1 | 5/2005 | Webb et al. | |
| 2005/0101384 A1 | 5/2005 | Parham | |
| 2005/0119047 A1 | 6/2005 | Olive | |
| 2005/0143168 A1 | 6/2005 | Torango | |
| 2005/0143169 A1 | 6/2005 | Nguyen et al. | |
| 2005/0159211 A1 | 7/2005 | Englman | |
| 2005/0163377 A1 | 7/2005 | Walch | |
| 2005/0176488 A1 | 8/2005 | Olive | |
| 2005/0178716 A1 | 8/2005 | Suri | |
| 2005/0192083 A1 | 9/2005 | Iwamoto | |
| 2005/0192099 A1 | 9/2005 | Nguyen et al. | |
| 2005/0209004 A1 | 9/2005 | Torango | |
| 2005/0215314 A1 * | 9/2005 | Schneider et al. | 463/26 |
| 2005/0239542 A1 | 10/2005 | Olsen | |
| 2005/0267610 A1 | 12/2005 | Shinoda | |
| 2005/0282626 A1 | 12/2005 | Manfredi et al. | |
| 2005/0282629 A1 | 12/2005 | Gagner | |
| 2006/0003829 A1 | 1/2006 | Thomas | |
| 2006/0009283 A1 * | 1/2006 | Englman et al. | 463/29 |
| 2006/0009285 A1 | 1/2006 | Pryzby et al. | |
| 2006/0025210 A1 | 2/2006 | Johnson | |
| 2006/0026604 A1 | 2/2006 | Tan et al. | |
| 2006/0030397 A1 | 2/2006 | Chan | |
| 2006/0030403 A1 | 2/2006 | Lafky et al. | |
| 2006/0035694 A1 | 2/2006 | Fuller | |
| 2006/0035705 A1 | 2/2006 | Jordan et al. | |
| 2006/0035706 A1 | 2/2006 | Thomas et al. | |
| 2006/0036552 A1 | 2/2006 | Gunyakti et al. | |
| 2006/0040732 A1 | 2/2006 | Baerlocher et al. | |
| 2006/0052159 A1 | 3/2006 | Cahill et al. | |
| 2006/0052161 A1 | 3/2006 | Soukup et al. | |
| 2006/0052162 A1 | 3/2006 | Soukup et al. | |
| 2006/0068897 A1 | 3/2006 | Sanford et al. | |
| 2006/0073872 A1 | 4/2006 | B-Jensen et al. | |
| 2006/0073887 A1 | 4/2006 | Nguyen et al. | |
| 2006/0073889 A1 | 4/2006 | Edidin et al. | |
| 2006/0073897 A1 | 4/2006 | Englman et al. | |
| 2006/0154718 A1 | 7/2006 | Willyard et al. | |
| 2006/0183537 A1 | 8/2006 | Dickerson | |
| 2006/0183538 A1 | 8/2006 | Michaelson et al. | |
| 2006/0287077 A1 | 12/2006 | Grav et al. | |

FOREIGN PATENT DOCUMENTS

| | | |
|---|---|---|
| AU | 524709 | 9/1982 |
| AU | 84/25946 | 2/1985 |
| AU | 555905 | 10/1986 |
| AU | 567001 | 11/1987 |
| AU | 585160 | 6/1989 |
| AU | 630112 | 9/1989 |
| AU | 589158 | 10/1989 |
| AU | 593059 | 2/1990 |
| AU | 628330 | 9/1992 |
| AU | 633469 | 1/1993 |
| AU | 667210 | 2/1993 |
| AU | 680920 | 2/1994 |
| AU | 649009 | 5/1994 |
| AU | 94/71515 | 8/1994 |
| AU | 655801 | 1/1995 |
| AU | 709724 | 2/1997 |
| AU | 96/69806 | 6/1997 |
| AU | 96/69807 | 6/1997 |
| AU | PO 7780 | 7/1997 |
| AU | 680920 | 8/1997 |
| AU | PO 9090 | 9/1997 |
| AU | 733599 | 10/1997 |
| AU | 97/45197 | 1/1998 |
| AU | 96/62115 | 2/1998 |
| AU | 97/45403 | 6/1998 |
| AU | 97/24645 | 7/1998 |
| AU | 97/43615 | 7/1998 |
| AU | 755826 | 8/1998 |
| AU | 98/74161 | 9/1998 |
| AU | 98/63553 | 10/1998 |
| AU | 98/63716 | 11/1998 |
| AU | 98/84162 | 3/1999 |
| AU | 98/87937 | 3/1999 |
| AU | 99/10969 | 5/1999 |
| AU | 707687 | 7/1999 |
| AU | 714299 | 8/1999 |
| AU | 99/17318 | 9/1999 |
| AU | 768285 | 9/1999 |
| AU | 711501 | 10/1999 |
| AU | 746082 | 10/1999 |
| AU | 756180 | 10/1999 |
| AU | 753102 | 11/1999 |
| AU | 765084 | 11/1999 |
| AU | 760617 | 1/2000 |
| AU | 716299 | 2/2000 |

(56) References Cited

FOREIGN PATENT DOCUMENTS

| | | |
|---|---|---|
| AU | 721968 | 7/2000 |
| AU | 722107 | 7/2000 |
| AU | 728788 | 1/2001 |
| AU | 744569 | 3/2001 |
| AU | 771847 | 3/2001 |
| AU | 2001 100032 | 11/2001 |
| AU | 2001 100033 | 11/2001 |
| AU | 748263 | 5/2002 |
| AU | 749222 | 6/2002 |
| AU | 754689 | 11/2002 |
| AU | 758306 | 3/2003 |
| DE | 3415114 | 11/1985 |
| DE | 3917683 | 12/1990 |
| DE | 4200254 | 8/1993 |
| EP | 0 342 797 | 11/1989 |
| EP | 0 444 932 | 2/1991 |
| EP | 0 420 586 | 4/1991 |
| EP | 0 433 420 | 1/1995 |
| EP | 0 798 676 | 10/1997 |
| EP | 0 874 337 | 10/1998 |
| EP | 0 952 563 | 2/1999 |
| EP | 0 926 645 | 6/1999 |
| EP | 0 944 030 | 9/1999 |
| EP | 1 637 196 | 9/2004 |
| EP | 1 467 329 | 10/2004 |
| EP | 1 498 860 | 1/2005 |
| EP | 1 513 114 | 3/2005 |
| EP | 1 528 516 | 5/2005 |
| EP | 1 528 517 | 5/2005 |
| GB | 2 151 054 | 10/1983 |
| GB | 2118445 | 11/1983 |
| GB | 2 142 457 | 6/1984 |
| GB | 2 137 392 | 10/1984 |
| GB | 2 139 390 | 11/1984 |
| GB | 2 147 773 | 5/1985 |
| GB | 2 148 135 | 5/1985 |
| GB | 2 153 572 | 8/1985 |
| GB | 2231189 | 11/1990 |
| GB | 2 282 690 | 4/1995 |
| GB | 2 328 311 | 2/1999 |
| GB | 2 387 703 | 10/2003 |
| JP | 7148307 | 6/1995 |
| WO | WO 94 12256 | 6/1994 |
| WO | WO 95 22811 | 8/1995 |
| WO | WO 95 30944 | 11/1995 |
| WO | WO 96 12262 | 4/1996 |
| WO | WO 96 24421 | 8/1996 |
| WO | WO 97 12338 | 4/1997 |
| WO | WO 97 27568 | 7/1997 |
| WO | WO 98 35309 | 8/1998 |
| WO | WO 98 47115 | 10/1998 |
| WO | WO 98 51384 | 11/1998 |
| WO | WO 99 03078 | 1/1999 |
| WO | WO 99 10849 | 3/1999 |
| WO | WO 99 60498 | 11/1999 |
| WO | WO 00 12186 | 3/2000 |
| WO | WO 00 32286 | 6/2000 |
| WO | WO 01 10523 | 2/2001 |
| WO | WO 01 15055 | 3/2001 |
| WO | WO 01 15790 | 3/2001 |
| WO | WO 03 030066 | 4/2003 |
| WO | WO 03 063019 | 7/2003 |
| WO | WO 03 075235 | 9/2003 |
| WO | WO 2004 035161 | 4/2004 |
| WO | WO 2004 066061 | 8/2004 |
| WO | WO 2005 27058 | 3/2005 |
| WO | WO 2005 076193 | 8/2005 |
| WO | WO 2005 081623 | 9/2005 |
| WO | WO 2005 083599 | 9/2005 |
| WO | WO 2005 099425 | 10/2005 |
| WO | WO 2005 099845 | 10/2005 |
| WO | WO 2005 106702 | 11/2005 |
| WO | WO 2005 113093 | 12/2005 |
| WO | WO 2006 014770 | 2/2006 |
| WO | WO 2006 014833 | 2/2006 |
| WO | WO 2006 039366 | 4/2006 |

OTHER PUBLICATIONS

*Aristocrat Technologies Australia Pty. Ltd.* v. *IGT* (Australia) [2007] FCA 37, dated Feb. 7, 2007.
Aristocrat Brochure, written by Aristocrat Gaming, published in 2004.
Aristocrat Buyer's Guide with ACES Ad, 2pp. (Mar.-May 1989).
Atronic Systems Progressive Products at G2E, published by Atronic in 2004, printed from ForRelease.com.
Bally Slot Machines Electro-Mechanicals 1964-1980 Book [In Part], Revised 3$^{rd}$ Edition written by Marshall Fey.
Bingo Advertisement and Jackpot Bingo Advertisements, written by Casino Data Systems, published in 1998 and 2001.
Bonus Spin Diamond Fives Advertisement, written by IGT, published in 1999.
Bonus Times Article, written by Strictly Slots, published in Jul. 2000.
Boom Advertisement, written by WMS Gaming, Inc., published in 1998.
Cartoon Jackpots description, printed from www.ballygaming.com/home.asp on Feb. 4, 2005.
Cash Box Advertisement, written by Anchor Games, published in 2000.
Cash Express Advertisements, written by Aristocrat, published in 2002.
Catalogue of Champions Advertisement, written by Aristocrat, published in 1990.
Computa Game Equipment Manual written and compiled by Russell Campbell, Sep. 1990.
Computa Game, "The Software Manual", Revision 3 for Computa Game Software Version 2.41 written by Clive Davis et al., published by Computa Game Pty Ltd., Jul. 1991.
Excerpt from Local Area Electronic Gaming Machine Communications Protocol, QCOM Version 1.5, by Queensland Treasury Office of Gaming Regulation printed Feb. 26, 1998.
FAST BUCK Systems Manual, written by International Game Technology, available to Mirage shift supervisors at least as early as May 30, 1990.
Federal Court of Australia, *Jupiter's Ltd* v. *Neurizon Pty Ltd* [2005] FCAFC 90 (including description of Activadata gaming system), dated May 26, 2005.
Federal Court of Australia, *Neurizon Pty Ltd* v. *Jupiter's Ltd* [2004] FCA 1012 (including description of Activdata gaming system), dated Oct. 21, 2004.
Federal Court of Australia, *Neurizon Pty Ltd.* v. *LTH Consulting and Marketing Services Pty. Ltd.* [2002] FCA 1547 (including description of Mega Gold System), dated Dec. 13, 2002.
Full House Advertisement, written by Anchor Games, published in 2000.
Gold Fever Advertisement and Game Description written Casino Data System, published in 1997.
Integrated Real Time On-Line Slot System—SDI, written by GRIPS Electronic GmbH, printed from website reported as archived on Feb. 20, 1997 (available at http://web.archive.org/web/19970220165559/www.grips.com/sdi.htm).
Jackpot Carnival Hyperlink Advertisement, written by Aristocrat, published prior to 2002.
Jewel in the Crown Advertisement, written by IGT, published in 2000.
Lemons, Cherries and Bell-Fruit-Gum, pp. 1 to 4 and 304 to 314, written by Bueschel, published in Royal Bell Books in Nov. 1995.
Mega Multiplier®, printed from www.wmsgaming.com, on May 22, 2001.
Mikohn Product Catalog, Chapters 1, 2, 6, 7 and 8, written by Mikohn, published in Jan. 1993.
Mikohn Supper Controller Manual, Chapters 1 to 3 and 6 to 7, written by Mikohn, published in 1989.
Millioni$er articles, written by Strictly Slots, published in Sep. 2003 and Mar. 2004.

(56) References Cited

OTHER PUBLICATIONS

Money Time advertisement, written by Mikohn Gaming, published in 1999.
M-Slot Series Primary Reel Product description from Lemons, Cherries and Bell-Fruit-Gum, written by Richard M. Bueschel, published in 1995.
PEM—Precision Electronic Meter, written by GRIPS Electronic GmbH, printed from website reported as archived on Feb. 20, 1997 (available at http://web.archive.org/web/19970220165753/www.grips.com/pem.htm).
Penguin Pucks article, written by Note in Gaming Marketplace, published prior to 2004.
Player Tracking on Slots, written by GRIPS Electronic GmbH, printed from website reported as archived on Feb. 20, 1997 (available at http://web.archive.org/web/19970220165921/www.grips.com/playtrac.htm).
Progressive Jackpot System article, printed from casinomagazine.com.managearticle.asp@c_290&a=518, on Jun. 21, 2004.
ProLINK Progressive Controller User/Reference Manual, written by Casino Data Systems, published in Apr. 1997.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines a Pictorial History of the First 100 Years (pp. 216, 242 to 243), $5^{th}$ edition, written by Marshall Fey, published in 1983-1997.
Super Cherry Advertisement, written by IGT, published in 2001.
Surprize Software Specification for MV2030—var 01, written by Aristocrat Leisure Industries, Australia, published prior to 2004.
Wide Area Progressive Link System, written by GRIPS Electronic GmbH, printed from website reported as archived on Feb. 20, 1997 (available at http://web.archive.org/web/19970220165457/www.grips.com/wap.htm).
Zorro Advertisement, written by Aristocrat, published in 2004.

\* cited by examiner

GAMING SYSTEM AND METHOD FOR PROVIDING MULTIPLE LEVEL PROGRESSIVE AWARDS WITH INCREASED ODDS OF WINNING HIGHER LEVEL PROGRESSIVE AWARDS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from 1 credit up to 125 credits (e.g., 5 credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

One such secondary or bonus game provides a player one or more free spin sequences. In these gaming devices, upon an occurrence of a triggering event in the primary game, the gaming device temporarily halts the primary game play and enables a player to enter a free spin mode or sequence wherein one or more free spins are provided to the player. The player plays the free spin mode or sequence, likely receives an award during one or more of the free spins and returns to the base game. Free spin mode or sequences that provide players with large awards or the potential to win large awards are attractive to players.

Progressive awards associated with gaming machines are also known. In one form, a progressive award is an award amount which includes an initial amount funded by a casino and an additional amount funded through a portion of each wager made on the progressive gaming machine. For example, 0.1% of each wager placed on the primary game of the gaming machine associated with the progressive award may be allocated to the progressive award or progressive award fund or pool. The progressive award grows in value as more players play the gaming machines and more portions of these players' wagers are allocated to the progressive award. When a player obtains a winning symbol or symbol combination associated with the progressive award, the accumulated progressive award is provided to the player. After the progressive award is provided to the player, the amount of the next progressive award is reset to the initial value and a portion of each subsequent wager on a gaming machine associated with a progressive award is allocated to the next progressive award.

A progressive award may be associated with or otherwise dedicated to a single or stand-alone gaming machine. Alternatively, a progressive award may be associated with or otherwise dedicated to multiple gaming machines which each contribute a portion of wagers placed at such gaming machine (s) to the progressive award. The multiple gaming machines may be in the same bank of gaming machines, in the same casino or gaming establishment (usually through a local area network ("LAN")) or in two or more different casinos or gaming establishments (usually through a wide area network ("WAN")). Such progressive awards are played for by one or more gaming devices in the same gaming establishment sometimes called local area progressives ("LAP") and such progressive awards played for by a plurality of gaming devices at a plurality of different gaming establishments are sometimes called wide area progressives ("WAP").

Moreover, a gaming machine or bank of gaming machines may be simultaneously associated with a plurality of progressive awards. In these multi-level progressive ("MLP") configurations, a plurality of progressive awards are arranged in a hierarchy and can start at different award or value levels, such as $10, $100, $1000 and $10,000. Each progressive award individually increments or increases until provided to a player. Upon a suitable triggering event at one or more of the gaming devices associated with the MLP, one or more of the progressive awards which form the MLP are provided to one or more of the players at such gaming devices.

There is a continuing need to provide new and different gaming machines and gaming systems as well as new and different ways to provide awards to players including bonus awards.

SUMMARY

In one embodiment, the gaming system disclosed herein includes a plurality of progressive awards arranged in a hierarchy. Each progressive award has or is associated with a trigger value. During game play, a player accumulates award values, and if the player's total award value is greater than or equal to the trigger value for one of the progressive awards, in one embodiment, the gaming system provides the player that progressive award. The gaming system also provides the player an improved chance of winning higher progressive awards when a lower progressive award is won. In one such embodiment, the improved chance is provided by increasing the total award value based on the lower progressive award value that is won. For example, if the lower progressive award is won, the player's total award value is increased to the lower progressive award value. As a result, the total award value is closer to the trigger value for one or more of the higher progressive awards than it would be if it were not increased based on the lower progressive award value. In one alternative embodiment, if the player's total award value is greater than or equal to the trigger value for a lower progressive award value, that lower progressive award value is not provided to the player if the player subsequently win a higher progressive award value.

In one example, a first progressive award has a progressive award value of $22 and a trigger value of $5, a second progressive award has a progressive award value of $100 and a trigger value of $25, and a player has a total award value of $3. If the player accumulates at least $2 more, the player wins the first progressive award. Additionally, the player's total award value is increased from $5 to $22. As a result, the player only needs to accumulate an additional $3 ($25−$22=$3) to win the second progressive award instead of an additional $20 ($25−$5=$20) to win the second progressive award. The player is more likely to accumulate $3 than $20, so the player's odds of winning the second progressive are increased.

In one embodiment, the trigger value for one or more progressive awards is the startup value for that progressive award. A startup value is the value to which a progressive award is initially set or reset upon being won. As described above or in any other suitable manner, the progressive award is increased based on a portion of one or more wagers until the progressive award is provided to a player. If a progressive award is provided to a player, the progressive award value is reset to the startup value and is again increased by one or more wagers in subsequent game play.

In one embodiment, the progressive awards are winnable in a bonus or secondary game. At the start of the bonus game, the player's total award value is set to an initial value, such as zero. Also, the player is provided one or more spins or activations of one or more symbol generators, such as reels. The symbol generators each include or are otherwise associated with a plurality of symbols. One or more symbols or combinations of symbols are associated with award values, bonus game terminators, or progressive award wins. If a spin result includes symbols or combinations associated with award values, those award values are added to the player's total award value. In an example, a spin result includes three cherry symbols on the same payline, a $1 symbol and a $5 symbol among other symbols. If three cherry symbols on the same payline is associated with an award value of $10, the $1 symbol is associated with $1 and the $5 symbol is associated with $5, a total of $16 (i.e., $10+$1+$5) is added to the player's total award value. It should be appreciated that any suitable alternative methods may be employed to track the player's total award value.

As described above, the gaming system determines whether the player's total award value is greater than or equal to one of the trigger values for the progressive awards. In one embodiment, this determination is made at designated intervals, such as after each generation of possible award values. It should be noted that, in one embodiment, the determination is only made with respect to trigger values associated with progressive awards that are not already won by the player during the current play of the bonus game.

In another example, a first progressive award is associated with a trigger value of $50 and a progressive award value of $250, a second progressive award is associated with a trigger value of $300, and a player has a total award value of $45. A spin results in $10 being added to the player's total award value, increasing it to $55. The gaming system determines that the total award value ($55) is greater than the trigger value ($50) of the first progressive award. As a result, the player wins the first progressive award and the total award value is increased to $250. After the next spin, the gaming system will not determine whether the total award value is greater than the trigger value ($50) of the first progressive award. Instead, the gaming system will determine whether the total award value is greater than or equal to the trigger value ($300) of the second progressive award. As a result, the player's chance of winning the next progressive award is improved because the total award value is advanced an additional $195 towards the trigger value of the next progressive award; however, the player is prevented from repeatedly winning one progressive award during the same play of a bonus game. The progressive award or awards won by a player are provided to the player before subsequent spins or, alternatively, upon termination of the bonus game.

In one embodiment, after each spin, the gaming system also determines whether a terminating condition occurs. Terminating conditions include a top progressive award being won, no more spins or activations being available, a terminator symbol or combination being generated, a lack of one or more symbols or combinations being generated or any other suitable condition. It should be understood that different embodiments can have different terminating conditions. If a game terminating condition occurs, the bonus game ends. However, if a game terminating condition does not occur, the bonus game continues the player is provided with another spin.

In one embodiment, a player is provided with an initial number of remaining spins or activations. After each spin, the number of remaining spins is reduced by one. If the number of remaining spins is zero, the bonus or secondary game ends.

In one embodiment, in addition to a progressive award being winnable by accumulating awards, the progressive award is winnable by generating a symbol combination associated with the progressive award. If the progressive award is won in either way, the player's total award value is increased to the progressive award value. In one example, a combination of three bell symbols on one payline is associated with winning a progressive award with a progressive award value of $50. Before a spin, the total award value is $2.50. Three bell symbols on one payline are generated in the spin. As a result, the player wins the progressive award and the total award value is set to $50. As a result of the increase in the total award value (i.e., $2.50 to $50), the player is significantly closer to having a total award value that meets or exceeds the trigger value (e.g. $75) for a higher progressive award.

In an alternative embodiment, instead of setting the total award value to a progressive award value that is won, the total award value is increased by the progressive award value. In an example, $5 is the trigger value associated with a progressive award with a progressive award value of $25. After a spin, the total award value is $5. As a result, the total award value is increased by the progressive award value and becomes $30 (i.e., $5+$25). Consequently, the player's chance of winning the next progressive award is improved because the total award value is advanced an additional $25 towards the trigger value (e.g., $50) of the next progressive award. In other embodiments, the total award value is increased by another suitable amount, including but not limited to: a predetermined amount which is not dependent on a progressive award value, a randomly determined amount within a range of amounts, a percentage of the difference between the total award value and the next trigger value, a predetermined amount less than the difference between the total award value and the next trigger value, a percentage or portion of the progressive award value won or a percentage or portion of the total award value.

In another embodiment, the player wins an initial progressive award at the beginning of the bonus game. Further, the initial total award value for the bonus game is set to the initial progressive award value. In an example, an initial progressive award value is $15.75. If a trigger condition occurs in the primary game, the bonus game is initiated, the player wins the initial progressive award, and the player's total award value is set to $15.75.

In another alternative embodiment, a progressive award won by a player is not necessarily provided to the player. The player risks an award reducing condition being generated on one or more subsequent spins. One example of an award reducing condition is a bankrupt symbol or combination. If a bankrupt symbol is generated, the player loses any progressive awards earned during play of the bonus game. Another example of an award reducing condition is a negative award symbol or combination. If a negative award symbol is generated, the player's winnings or total award value is reduced by a reduction value associated with the negative award symbol.

In one embodiment, the player is offered the option of ending the bonus game before activating a next spin to prevent losing some or all of the player's accumulated winnings. For example, after winning a progressive award, the player may decide to end the game and receive the award instead of risking a bankrupt symbol being generated on the next spin. In another embodiment, the player loses any progressive award won during the bonus game if the player wins a progressive award, decides to continue playing for the next progressive award and fails to reach the next trigger value.

In another embodiment, the player can win additional spins or anti-terminators during play of the bonus game. For example, the generation of a free spin symbol in a spin of the bonus game increases the number of remaining spins by one or more. Similarly, if a player wins an anti-terminator and a terminator symbol is generated on a subsequent spin, the anti-terminator counters the effects of the terminator symbol, enabling the game to continue. In another embodiment, a number of remaining spins is not maintained and the player is provided additional spins or activations until a game terminating condition occurs.

In an alternative embodiment, instead of the progressive awards being provided to the player, the total award value is provided to the player at the end of the bonus game. In an example, during a bonus game, a player won a progressive award with a progressive award value of $10,000. On subsequent spins, the player's total award value increased by $35 to a total of $1035 before the bonus game ended due to the generation of a terminator symbol. However, the next trigger value is $15,000. As a result, $1035 is provided to the player. In another embodiment, the higher of the progressive award and the total award value is provided to the player. In other embodiments, other suitable amounts are provided to the player.

As mentioned above, in one embodiment, a player is only provided one of the progressive awards won (or qualified for) during the game. For example, a player enters the bonus game because a symbol combination associated with winning a second progressive award occurs during play of the primary game. During the bonus game, the player accumulates sufficient awards to also win a third progressive award. At the end of the bonus game, from the awards won by the player (i.e., the second progressive award and the third progressive award), the one with the higher value is provided to the player and reset to its startup value. The other won progressive awards are not provided to the player and continue to increase in value without being reset.

In one embodiment, at least one progressive award is associated with a maximum value. For example, the maximum value can be the startup value of the next progressive award in the hierarchy. Once the progressive award value is incremented to the maximum value, additional values which would otherwise increment the progressive award value are allocated for different uses. For example, the additional values are stored for later use to fund the startup value of this or another progressive award.

Alternatively, the additional values or a portion of the additional values fund a one-time increase in the startup value for some progressive award. As a result, the progressive award is reset to a higher value than the regular startup value. For example, before a maxed-out progressive award is won, $15 is accumulated from additional values that could not be added to the maxed-out progressive award. Instead of the progressive award being reset to its regular startup value of $10, it is reset to $15. In another embodiment, the additional values are added to the progressive value of the next non-maxed-out progressive award in the hierarchy.

In an alternative embodiment, the trigger value necessary to win a progressive award is dependent upon the total award value at some point in the bonus game. As a result, after winning a progressive award, a player is still required to accumulate a minimum additional amount of awards to win the next progressive award. For example, the trigger value for a second progressive award is $25 more than the total award value when the first progressive award is won. In this example, the first progressive award value is $15, and the trigger value for the first progressive award is $10. If the player wins the first progressive award by having a total award value of $10.75 and the total award value becomes $25.75 ($10.75+$15), the player must reach at least a total award value of $50.75 to win the second progressive award. It should be noted that the trigger amount can be dependent in any suitable manner upon the total award value at some point in the bonus game, including but not limited to: being a fixed amount higher, being a fixed percentage higher or being a randomly generated amount (or percentage) within a range of amounts higher.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one embodiment, total award values persist for use in a later played game. In one embodiment, a persistent total award value is associated with an individual player. As a result, the player is able to accumulate awards values in a bonus game, save the total award value, stop playing for a period of time, return to playing and not lose the total award value the player previously won. Alternatively, the persistent total award values are associated with a gaming device. As a result, if a first player accumulates a total award value in a bonus game on a gaming device and then stops playing, the total award value is stored by or in association with that gaming device. The next player to play the bonus game on the gaming device plays using the total award value previously accumulated by the first player.

In another alternative embodiment, a progressive award is won based on a total award value only when a total award value is exactly equal to a trigger value associated with the progressive award. A player is provided with the opportunity to accumulate award values or other suitable progress indicators to produce a total award value as described above or in any other suitable manner. If the total award value is equal to the trigger value associated with one of the progressive awards in the hierarchy, the player wins that progressive award.

Additional features and advantages are described in, and will be apparent from, the following Detailed Description and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
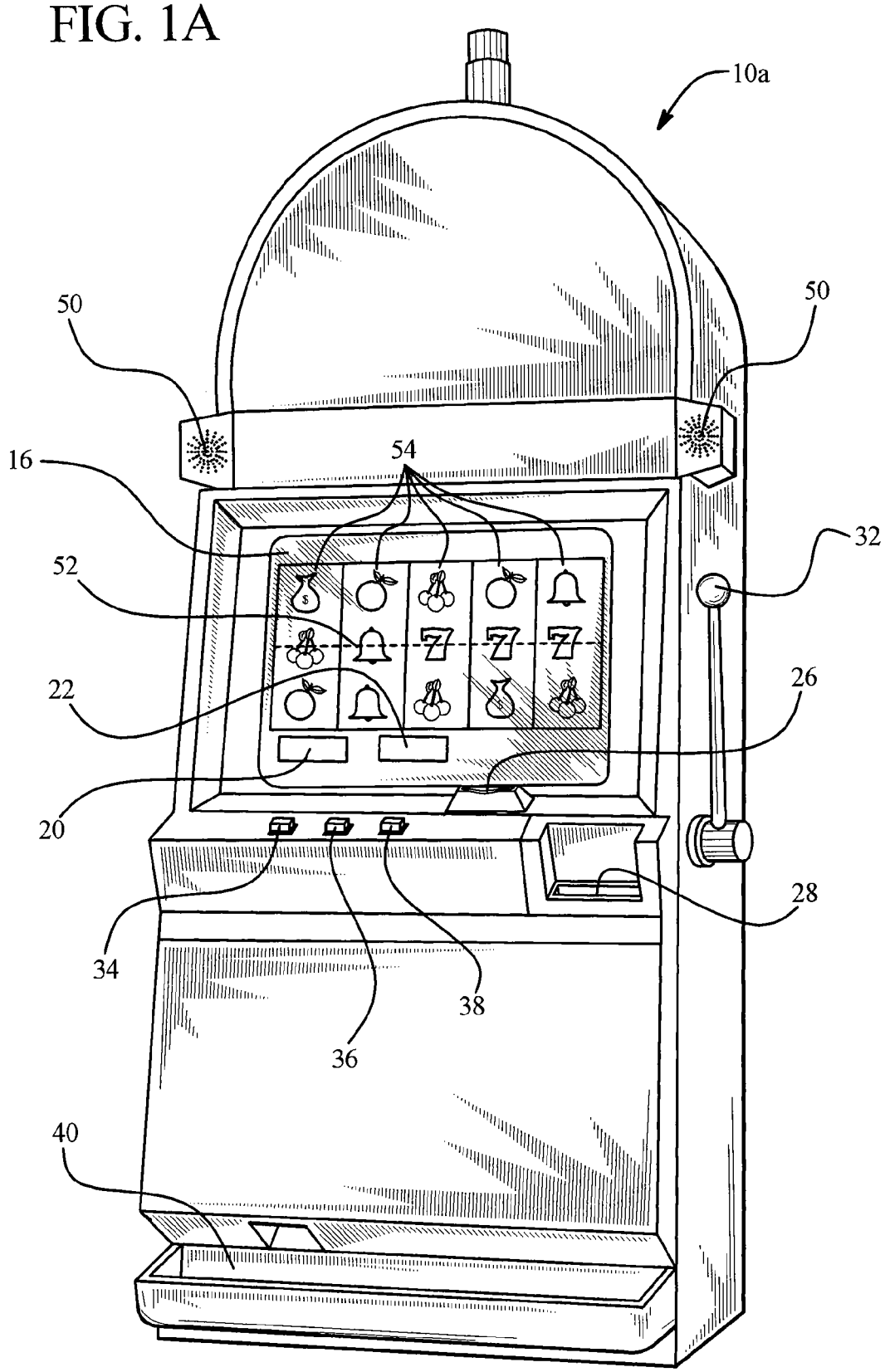
FIG. 1A is a front-side perspective view of one embodiment of the gaming device disclosed herein.
Figure 1B:
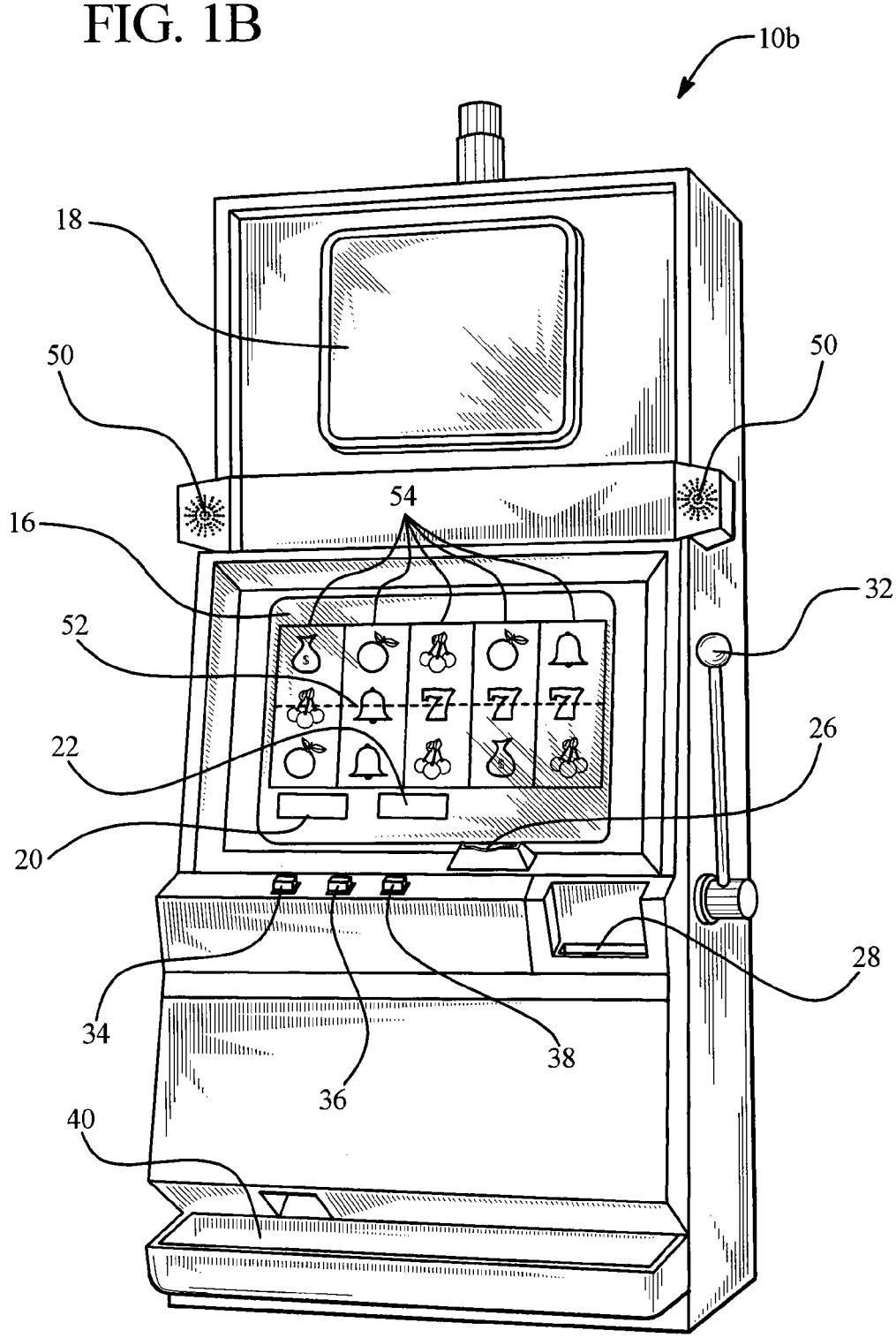
FIG. 1B is a front-side perspective view of another embodiment of the gaming device disclosed herein.

Referring now to the drawings, two example alternative embodiments of the gaming device of the disclosed herein are illustrated in FIGS. 1A and 1B as gaming device 10a and gaming device 10b, respectively. Gaming device 10a and/or gaming device 10b are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
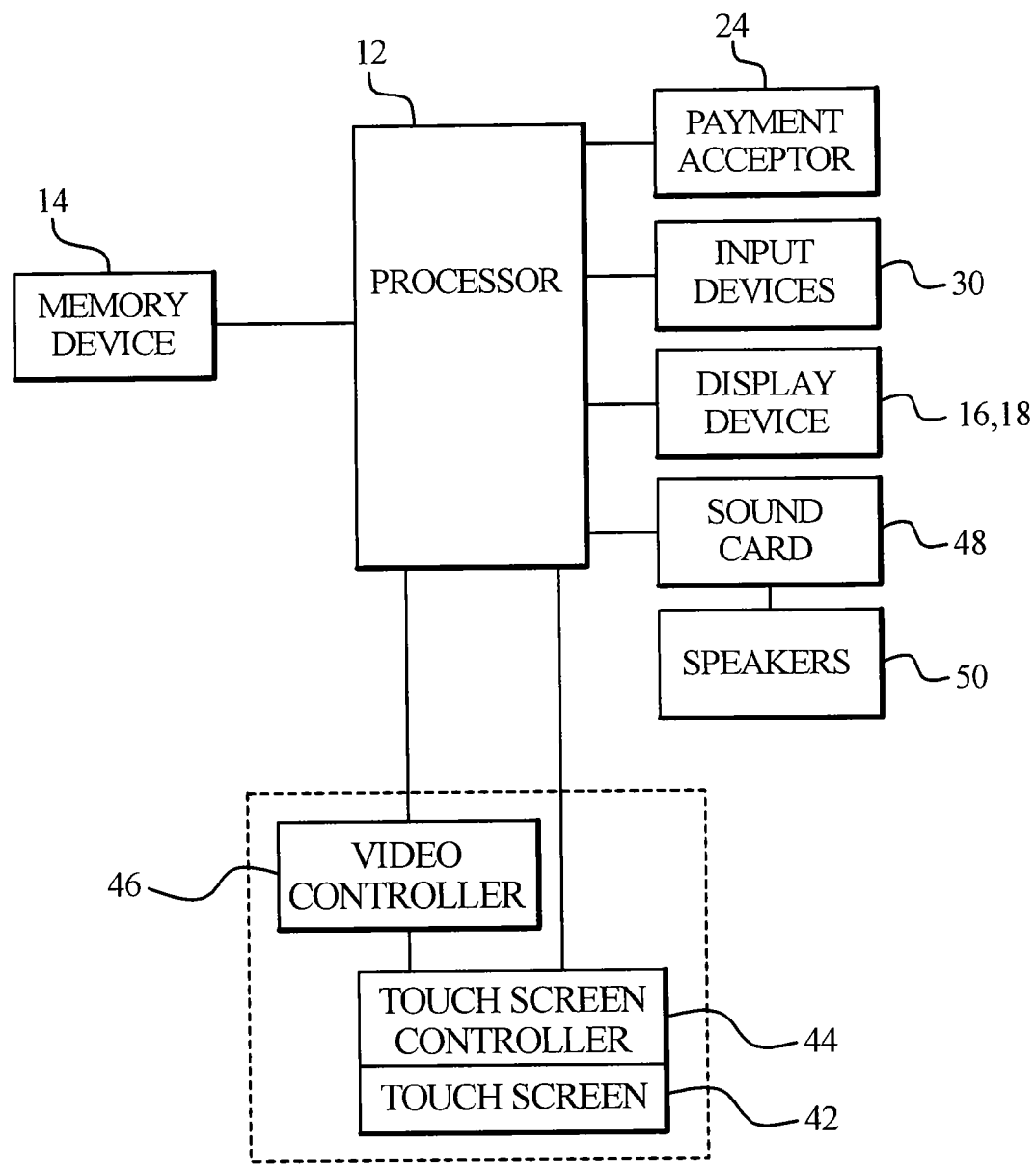
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. As seen in FIGS. 1A and 1B, in one embodiment, the gaming device includes a credit display 20 which displays a player's number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surfaceconduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate pay table and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
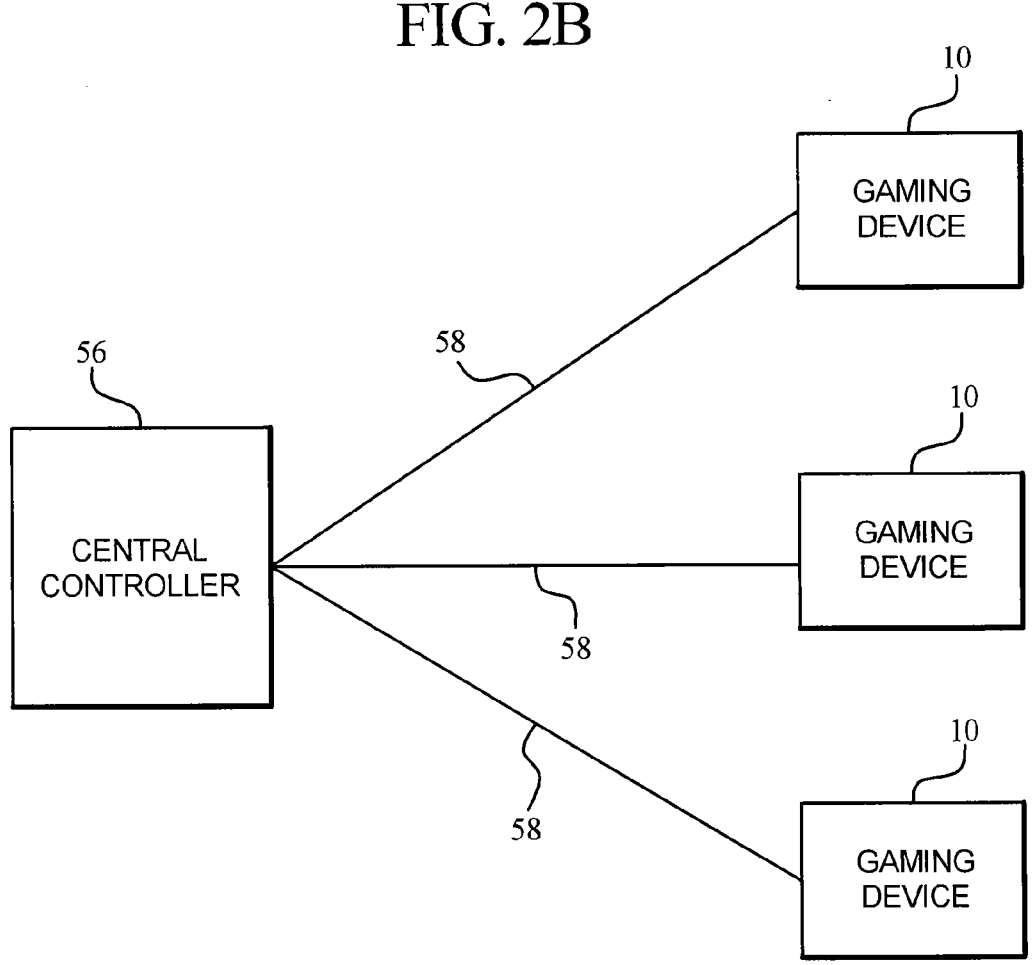
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card.

Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Progressive Awards

In one embodiment, a plurality of gaming devices at one or more gaming sites are networked to the central server in a progressive configuration, wherein a portion of each wager placed is allocated to one or more progressive awards. In one embodiment, the progressive awards are associated with the system gaming machines which each contribute portions of the progressive awards. In one such embodiment, different progressive awards are associated with different numbers of gaming devices. For example, a progressive award valued at $10,000 may be associated with ten gaming devices while another progressive award valued at $500,000 may be associated with one-hundred gaming devices. In one embodiment, the multiple gaming machines may be in the same bank of machines, in the same casino or gaming establishment (such as through LAN), or in two or more different casinos or gaming establishments (such as through a WAN). In another embodiment, each individual gaming machine maintains one or more progressive awards wherein a portion of the wagers placed at that respective gaming machine is allocated to one or more progressive awards maintained by such individual gaming machine. In another embodiment, each individual gaming machine maintains one or more progressive awards and the central server simultaneously or substantially simultaneously maintains one or more progressive awards. In one such embodiment, the lower valued, more frequently triggered progressive awards are maintained by the individual gaming machines and the higher valued, less frequently triggered progressive awards are maintained by the central server. In one embodiment, a portion of each wager placed at a designated gaming device is allocated to one or more progressive awards associated with that designated gaming device. In another embodiment, a portion designated wagers placed at a designated gaming device, such as a portion of each maximum wager placed or a portion of each side wager placed, is allocated to one or more progressive awards associated with that designated gaming device.

In one embodiment, a master host site computer is coupled to a plurality of the central servers at a variety of mutually remote gaming sites for providing a multi-site linked progressive automated gaming system. In one embodiment, a master host site computer may serve gaming devices distributed throughout a number of properties at different geographical locations including, for example, different locations within a city or different cities within a state. In one embodiment, the master host site computer is maintained for the overall operation and control of the system. In this embodiment, a master host site computer oversees all or part of the progressive gaming system and is the master for computing all or part of the progressive jackpots. All participating gaming sites report to, and receive information from, the master host site computer. Each central server computer is responsible for all data communication between the gaming device hardware and software and the master host site computer.

In one embodiment, one or more of the progressive awards are arranged in a hierarchy and start at different levels such as $10, $100, $1000 and $10,000 and increment or increase until provided to a player. The progressive awards accumulate based on a small percentage (such as 0.1%) of coin-in or wagered amounts in a conventional manner. In one embodiment, the percentage that goes to each progressive award is equal (such as 0.1% to each of four progressive awards). At this accrual rate, player wagers totaling $1,000,000 are required for the progressive to reach $1000. At least a fraction of this amount may be funded by the gaming establishment, such as a casino's marketing department, by using a starting value higher than zero to make the progressives attractive even after they are reset. In other embodiments, two or more of the progressive awards may be funded by different percentages. In these embodiments, the central server and/or individual gaming device processor continues to increase the progressive levels until a progressive award is provided to a player (upon the occurrence of a progressive award triggering event), at which point the progressive is reset and another progressive award starts incrementing from the appropriate default progressive award level. In another embodiment, two or more of the progressive awards may be funded at different temporal rates. In this embodiment, the different progressive awards are incremented or funded in different increments of time wherein until the progressive hits, a set amount is added to the progressive at each determined time increment. In another embodiment, two or more of the progressive awards may each be incremented or funded based on different incrementing factors or incrementors. In this embodiment, a first of the progressive awards may increment each time a first incrementing factor occurs and a second of the progressive awards may increment each time a second incrementing factor occurs, wherein the first incrementing factor and the second incrementing factor are different. Examples of incrementing factors could be a symbol-driven trigger in the base game, the occurrence of one or more events in a bonus game, the player betting a maximum amount, a percentage of possible gaming machines being actively played or in active status, or any other suitable method for defining an incrementor.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount on any payline (i.e., the player need not place the maximum bet and the side bet to be eligible to win one of the progressive awards). It should be appreciated that one or more of the progressive awards may each be funded, at least in part, based on the wagers placed on the primary games of the gaming machines in the gaming system, via a gaming establishment or via any suitable manner. Further, it should be appreciated that a gaming system can require each player to place the same sized wager or side bet to be eligible to win on or more of the progressive awards. Alternatively, a gaming system enables preferred players (e.g., members of a club, players who meet a threshold for frequency and/or quantity of wagers, players celebrating their birthday, anniversary or other special event, etc.) to be eligible to win one or more of the progressive awards by placing a smaller wager or side bet than other players. It should also be appreciated that the wager or side bet size requirements can also apply to players wagering on multi-denominational systems. For example, both a player wagering in nickel increments and a player wagering in dollar increments are required to place the same sized side bet (e.g., $5) to be eligible to win the progressive awards.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount on any payline (i.e., the player need not place the maximum bet and the side bet to be eligible to win one of the progressive awards). It should be appreciated that one or more of the progressive awards may each be funded, at least in part, based on the wagers placed on the primary games of the gaming machines in the gaming system, via a gaming establishment or via any suitable manner. Further, it should be appreciated that a gaming system can require each player to place the same sized wager or side bet to be eligible to win one or more of the progressive awards. Alternatively, a gaming system enables preferred players (e.g., members of a club, players who meet a threshold for frequency and/or quantity of wagers, players celebrating their birthday, anniversary or other special event, etc.) to be eligible to win one or more of the progressive awards by placing a smaller wager or side bet than other players. It should also be appreciated that the wager or side bet size requirements can also apply to players wagering on multi-denominational systems. For example, both a player wagering in nickel increments and a player wagering in dollar increments are required to place the same sized side bet (e.g., $5) to be eligible to win the progressive awards.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, this minimum wager level is placing a wager on all available paylines in a slot primary game or alternatively placing a wager on all available poker hands in a multi-hand poker primary game. In another embodiment, no minimum wager level is required for a gaming machine to qualify to be selected to obtain one of the progressive awards.

In one embodiment, the central server or other central controller determines when one or more progressive award wins are triggered. In this embodiment, a central controller and an individual gaming machine work in conjunction with each other to determine when a progressive award win is triggered, for example through an individual gaming machine meeting a predetermined requirement or criteria established by the central controller. In another embodiment, an individual gaming machine may determine when one or more progressive award wins are triggered. In another embodiment, an individual gaming machine may determine when at least one progressive award win is triggered and the central controller determines when at least one progressive award win is triggered.

In one embodiment, different gaming devices in the gaming system have different progressive awards available to the player. In one such embodiment, different types of gaming devices are associated with different types of progressive awards based on the configuration of the gaming system. In one embodiment, zero, one or more progressive awards may be associated with each of the gaming devices in the gaming system while zero, one or more different progressive awards may be associated with a plurality of, but not all of the gaming devices in the gaming system.

In one embodiment, progressive awards are associated with a startup value, a trigger value and a progressive award amount. A startup value is the value to which a progressive award value is initially set or reset upon being won. As described above or in any other suitable manner, the progressive award value is increased based on a portion of one or more wagers until the progressive award is won. In one embodiment, a progressive award is won when an accumulated award amount meets or exceeds the trigger value. In one embodiment, the trigger value for a progressive award is the startup value for that progressive award. In other embodiments, the trigger value is independent of the startup value.

In one embodiment, a bonus or secondary game is initiated upon the occurrence of a triggering event. In one embodiment, the triggering of the bonus event occurs through a game play event, such as the generation of a designated symbol or symbol combination or any other suitable symbol-driven trigger, at an individual gaming machine in the gaming system. In another embodiment, the triggering of the bonus event occurs independent of any game play event which may occur in any primary game or any secondary game played at one or more gaming machines in the gaming system.

In one such embodiment, the triggering of the bonus event occurs based on at least one accumulated value progressive award incremented to a progressive award hit value. In this embodiment, the gaming system includes one or more accumulated value progressive awards or $N^{th}$ coin progressive awards. Such accumulated value progressive awards are driven by an amount of wagers placed or a suitable coin-in amount. In one such embodiment, each accumulated value progressive award is associated with a range of values, wherein each progressive award will be provided to a player of a gaming device in the gaming system when the progressive award increments to a progressive award hit value within the range of values associated with that progressive award. That is, when an accumulated value progressive award increases to a determined progressive award hit value, a triggering of the bonus event will occur. In different embodiments, the progressive award hit value at which an accumulated value progressive award causes a triggering of the bonus event to occur is predetermined, randomly determined, determined based on the wagers placed in the gaming system, determined based on the status of one or more players (such as determined through a player tracking system), determined based on time, or determined based on any other suitable method. In this embodiment, after the accumulated value progressive award causes a triggering of the bonus event to occur, the accumulated value progressive award is reset to a default value and starts incrementing from the default progressive award level.

In operation of one such embodiment, the central server which hosts one of these accumulated value progressive awards: (1) determines a minimum amount and a maximum amount for the progressive award or prize pool, (2) provides that the progressive award or prize pool starts at the minimum, (3) determines an accumulated value progressive award hit value between the minimum amount and the maximum amount, (4) increments the progressive award or prize pool with a configured percent of coin-in, and (5) causes a triggering of the bonus event to occur when the progressive award or prize pool equals the determined accumulated value progressive award hit value. In this embodiment, the accumulated value progressive award hit value is determined at random to maintain fairness for the players at the gaming devices in the gaming system, wherein the players are not aware of any determined accumulated value progressive award hit value.

In different embodiments, the range of values associated with an accumulated value progressive award is predetermined, randomly determined, determined based on the wagers placed in the gaming system, determined based on the status of one or more players (such as determined through a player tracking system), determined based on time, or determined based on any other suitable method. In one embodiment, a plurality of accumulated value progressive awards are associated with different value ranges. In another embodiment, each of a plurality of accumulated value progressive awards are associated with a different value range. In another embodiment, a plurality of accumulated value progressive awards are associated with the same value range. In another embodiment, the value range associated with an accumulated value progressive award a player plays for is based on a player's status (via a player tracking system). For example, a bronze level player may play for an accumulated value progressive award associated with a value range of $10 to $100, a silver player may play for an accumulated value progressive award associated with a value range of $200 to $500 and a gold player may play for an accumulated value progressive award associated with a value range of $1000 to $5000.

In another embodiment, the triggering of the bonus event is based on time. In this embodiment, a time is set for when a triggering event will occur. In one embodiment, such a set time is based on historic data. For example, if previous bonus event triggers have occurred after approximately sixty-seven hours, a bonus event may be set to trigger sixty-seven hours from the conclusion of the previous bonus event. In one embodiment, a suitable algorithm is implemented to determine the player who wagered at or closest to this time with tie-breaking based on any number of factors (e.g., player tracking history, amount of or recent wagers placed). In this embodiment, the gaming device which the algorithm determined wagered closest to when the bonus event triggered is designated the triggering gaming device. In another embodiment, one of the gaming devices which placed a wager during a designated time period is randomly selected and designated as the triggering gaming device.

In another such embodiment, the triggering of the bonus event is based on a predefined variable reaching a defined parameter threshold. For example, the bonus event is triggered when the $500^{th}$ different player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that would define a threshold for the progressive.

In another embodiment, the triggering of the bonus event occurs after a random number of plays in which a progressive award is not provided to a player. In another embodiment, the triggering of the bonus event is based upon gaming system operator defined player eligibility parameters stored on a player tracking system (such as via a player tracking card or other suitable manner). In another embodiment, the triggering of the bonus event is based upon gaming system operator defined player eligibility parameters stored on a player tracking system (such as via a player tracking card or other suitable manner).

In another such embodiment, the triggering of the bonus event includes a system determination which is based on a random selection by the central controller. In this embodiment, the central controller tracks all active gaming machines and the wagers they placed (via an accumulated wager pool). When the accumulated wager pool at least exceeds a predefined threshold, the central controller randomly determines (at predetermined intervals) if a bonus event will occur. In one embodiment, the player who consistently places a higher wager is more likely to receive cause a bonus event to be triggered than a player who consistently places a minimum wager.

In another such embodiment, the central controller determines, in cooperation with the gaming device, when to trigger a bonus event by utilizing one or more random number generators. In this embodiment, the central controller determines when to trigger a bonus event by determining if any numbers allotted to a gaming device match a randomly selected number. In one such embodiment, upon or prior to each play of each gaming machine, a random number is selected from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine triggers a bonus event. It should be appreciated that any suitable manner of triggering the bonus event may be implemented with the gaming system disclosed herein.

Progression Through Progressive Award Wins

In one embodiment, a triggered secondary or bonus game enables a player to win one or more progressive awards. That is, a player is provided a chance to move up one or more progressive award levels of an MLP, wherein winning progressive award levels is based on the outcome of the secondary game. Further, the gaming system disclosed herein provides a player an improved chance of winning higher progressive awards when a lower progressive award is won by increasing a total award value based on the lower progressive award.

As shown in FIGS. 3A to 3D, a gaming system of one embodiment includes a plurality of progressive awards arranged in a hierarchy. Upon the occurrence of a triggering event or qualifying condition, a bonus or secondary game is started. Specifically, there are four progressive awards arranged from first (lowest startup value) to fourth (highest startup value). The first progressive award 102a has a startup value of $5 and a trigger value of $5. The progressive award value of the first progressive award 102a is illustrated as being $9.50. The second progressive award 102b has a startup value of $20 and a trigger value of $20. The progressive award value of the second progressive award 102b is illustrated as being $30. The third progressive award 102c has a startup value of $100 and a trigger value of $100. The progressive award value of the third progressive award 102c is illustrated as being $150. The fourth progressive award 102d has a startup value of $1000 and a trigger value of $1000. The progressive award value of the fourth progressive award 102d is illustrated as being $1200. Other embodiments have other suitable numbers of progressive awards with various other suitable startup and award values.

Figure 3A:
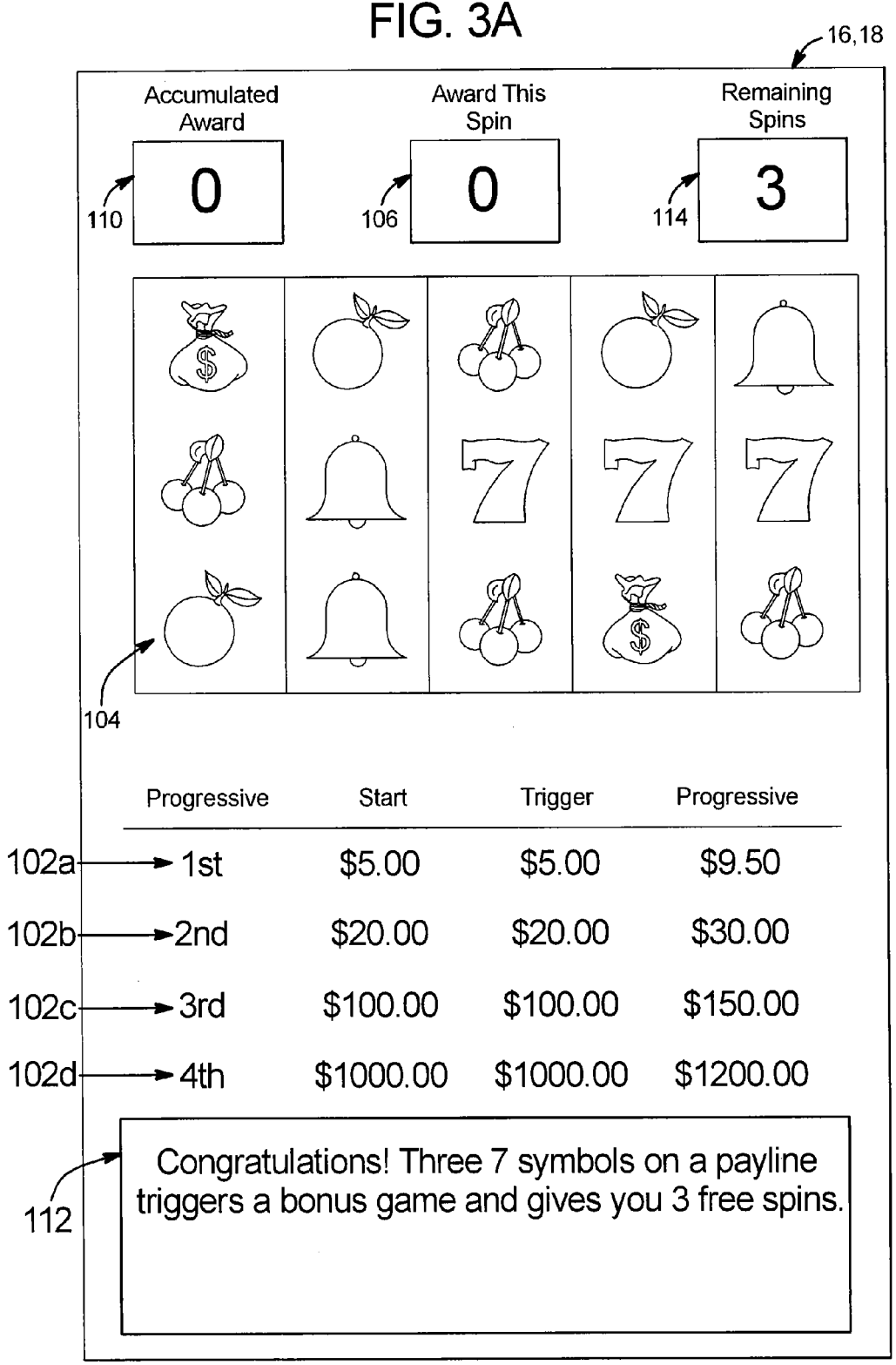
FIG. 3A is a front view of a display at the start of a bonus game of one embodiment.

During the bonus game, the player can win a next higher progressive award in the hierarchy by accumulating award values or alternatively points. FIG. 3A illustrates the display of the bonus game at the start of the game. A message area 112 displays a message indicating that the bonus game is triggered because the most recent spin result from the primary game included three "7" symbols on one payline. The total award value is set to zero and is displayed in total award indicator or meter 110. Because the bonus game has not progressed to the first spin, there is no award value for the current spin. However, the award this spin indicator or meter 106 also displays a value of zero.

The player is provided one or more spins or activations of one or more symbol generators, such as reels. Specifically, the player is provided with a predetermined number of spins which may be dependent or independent of a player's wager or one or more triggering events. More specifically, as explained in message area 112, the player is provided with three spins because three "7" symbols were generated on one payline. If three bar symbols were generated on one payline, the player would have received ten spins, for example. The number of spins remaining (i.e., 3) is displayed in remaining spins indicator or meter 114. After each spin, the number of remaining spins is reduced by one. If the number of remaining spins is zero, the bonus game ends.

The one or more symbol generators each include or are otherwise associated with a plurality of symbols 104. One or more symbols 104 or symbol combinations are associated with award values, bonus game terminators, or progressive award wins. Specifically, the relationships between awards and symbols or symbol combinations are the same as in a primary game.

If the spin result includes symbols or combinations associated with award values, the total resulting award value is displayed in award this spin indicator 106. The total resulting award value for the spin is also added to the player's total award value and displayed in the total award indicator 110.

Figure 3B:
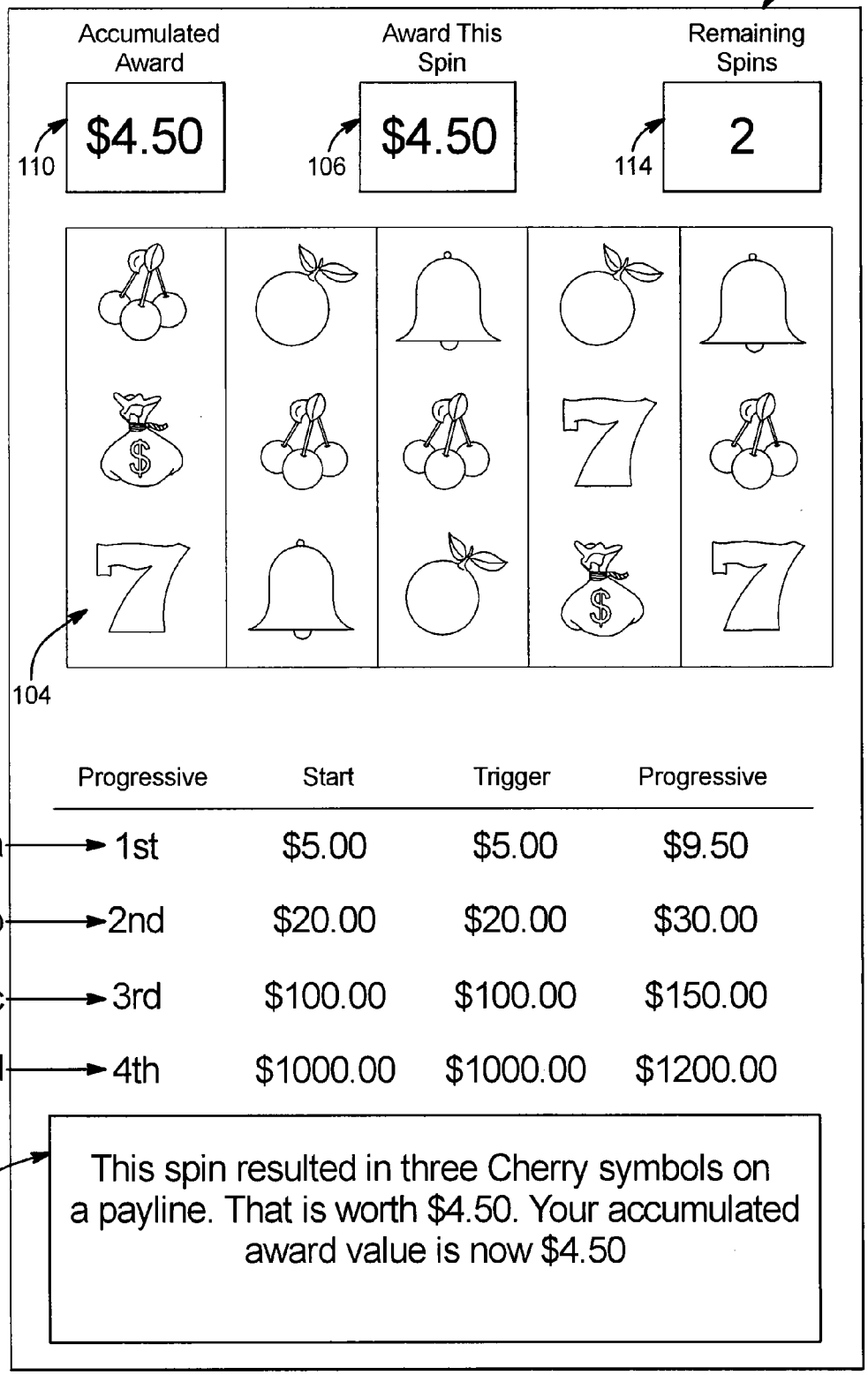
FIG. 3B is a front view of a display showing the result of a first spin of a bonus game of one embodiment.

FIG. 3B shows the result of the player's first spin of the bonus game. A message in the message area 112 explains that three cherry symbols on one payline results in an award of $4.50. As a result, the award this spin indicator 106 displays the amount of $4.50. The total award value ($0) is increased by the award for this spin ($4.50). As a result, the total award indicator 110 also displays a value of $4.50. Further, the remaining spins indicator 114 displays that two spins remain.

During play of the bonus game, if the player's total award value as displayed in the total award indicator 110 is greater than or equal to a trigger value for a progressive award, the player wins the progressive award. In the embodiment illustrated in FIGS. 3A to 3D, the trigger value for each of the four progressive awards is the startup value of the progressive award. As a result, no progressive award is won by the spin illustrated in FIG. 3B. However, FIG. 3C illustrates the results of a second spin in which the generation of three moneybag symbols on one payline results in an award of $1.25.

Figure 3C:
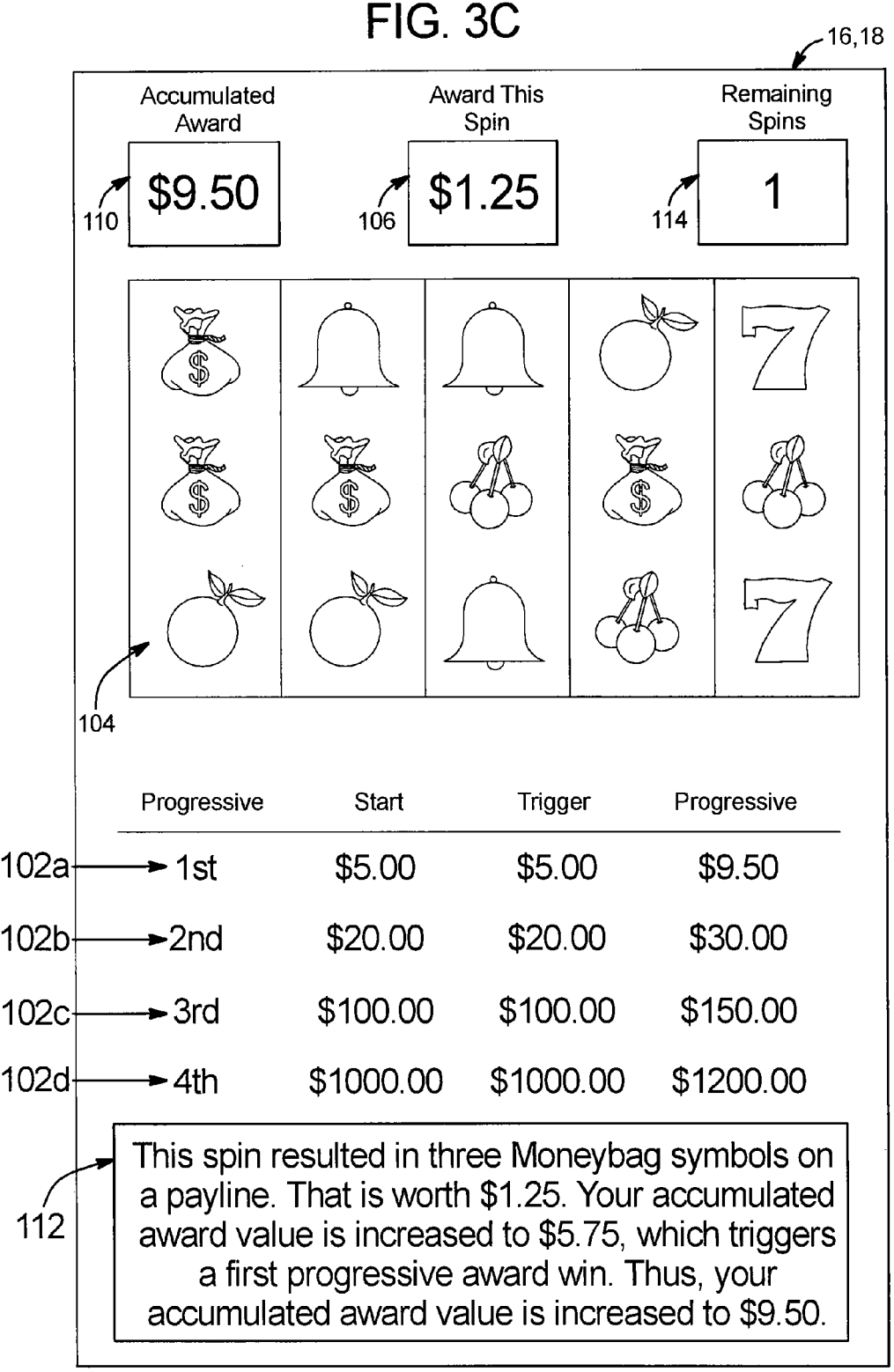
FIG. 3C is a front view of a display showing the result of a second spin of a bonus game of one embodiment in which a progressive award is won.

Award this spin indicator 106 in FIG. 3C displays the amount of $1.25. As explained in message area 112, the total award value is increased to $5.75 ($4.50+$1.25), which is greater than the trigger value of the first progressive award. As a result, the player wins the first progressive award and the first progressive award is provided to the player. The total award value is set to the first progressive award value of $9.50, and the total award indicator 110 displays the amount of $9.50. As a result, the player is advanced closer to reaching the trigger values for the higher progressive awards. In other words, the player only needs to accumulate an additional $11.50 to win the second progressive prize rather than an additional $14.25. Further, the remaining spins indicator 114 displays that one spin remains.

Figure 3D:
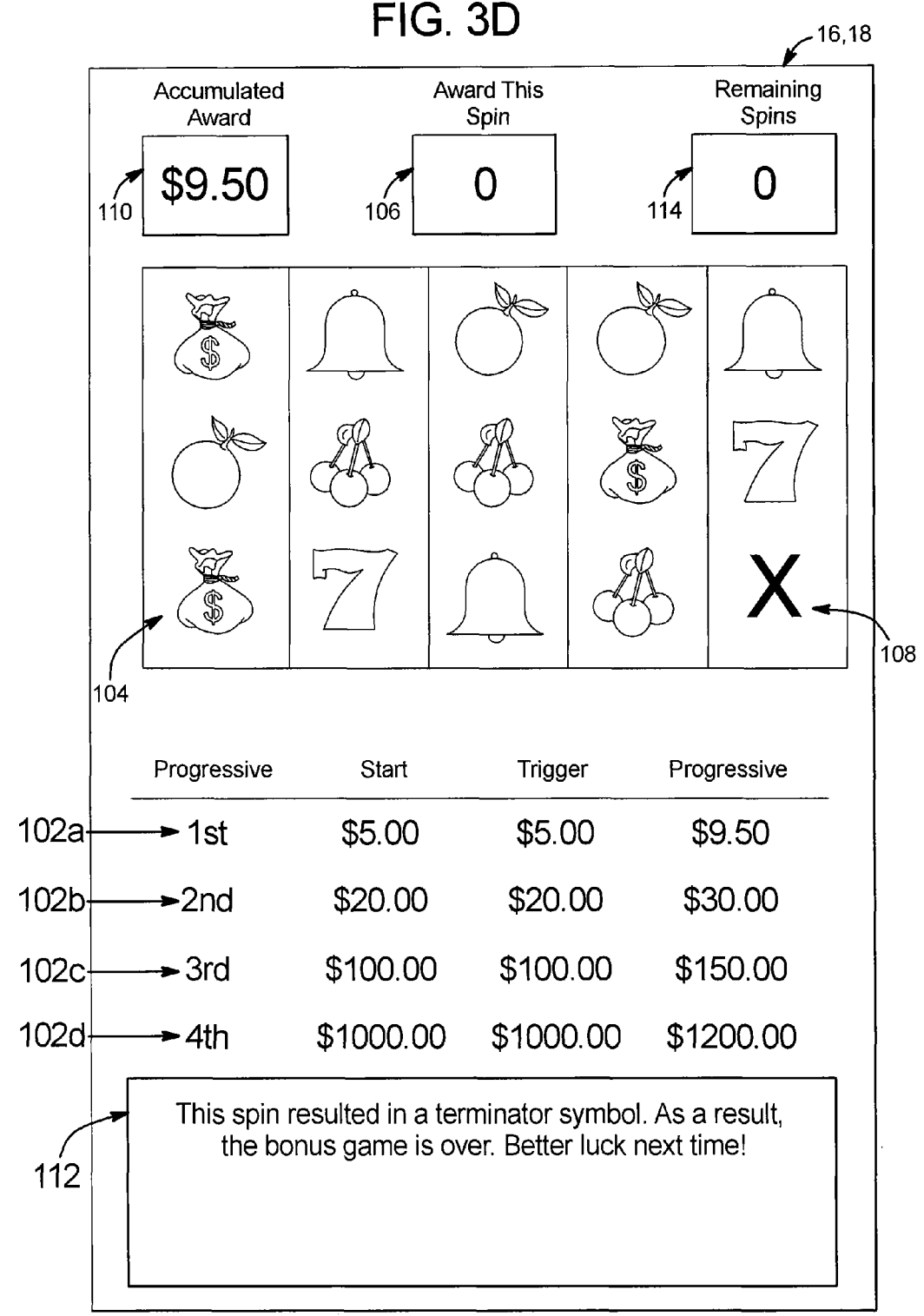
FIG. 3D is a front view of a display showing the result a third spin of a bonus game of one embodiment in which a terminator symbol is generated.

As shown in FIG. 3D, the first progressive award is reset to its startup value. FIG. 3D also shows the result of the third spin. The spin result includes a terminator symbol 108. As explained in message area 112, as a result of the generation of the terminator symbol 108, the bonus game ends. It should be noted that even if the terminator symbol 108 was not generated, the bonus game would end because, as displayed in remaining spins indicator 114, the number of remaining spins is zero.

Figure 3E:
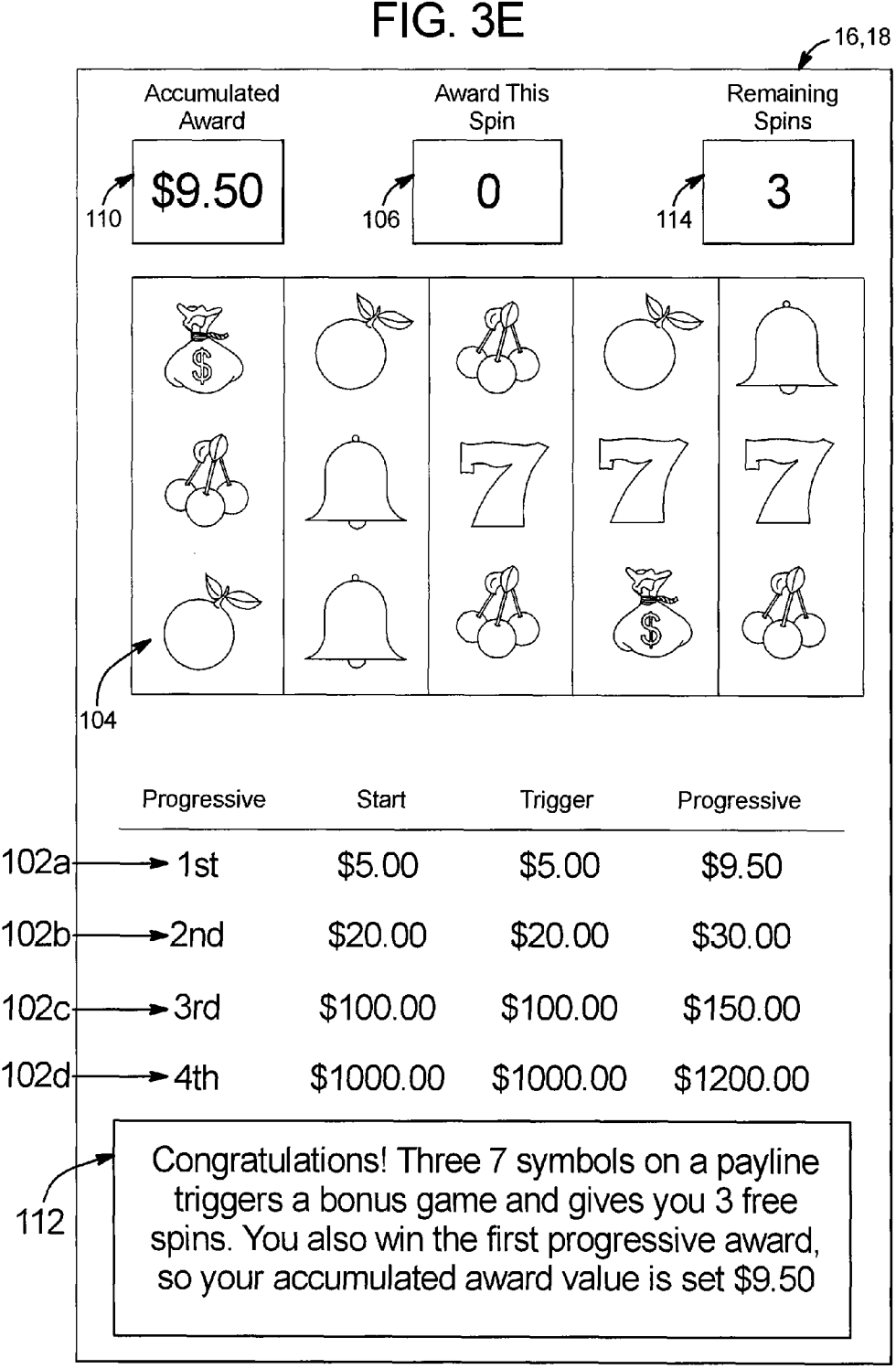
FIG. 3E is a front view of a display at the start of a bonus game of one embodiment in which an initial value for the total award value is a progressive award value.

It should be noted that in other embodiments, the total award indicator 110 is set to the value of a progressive award awarded to the player at initiation of the bonus game or any other suitable amount. For example, as shown in FIG. 3E, the first progressive award value ($9.50) becomes the player's total award value at the start of the bonus game.

Figure 3F:
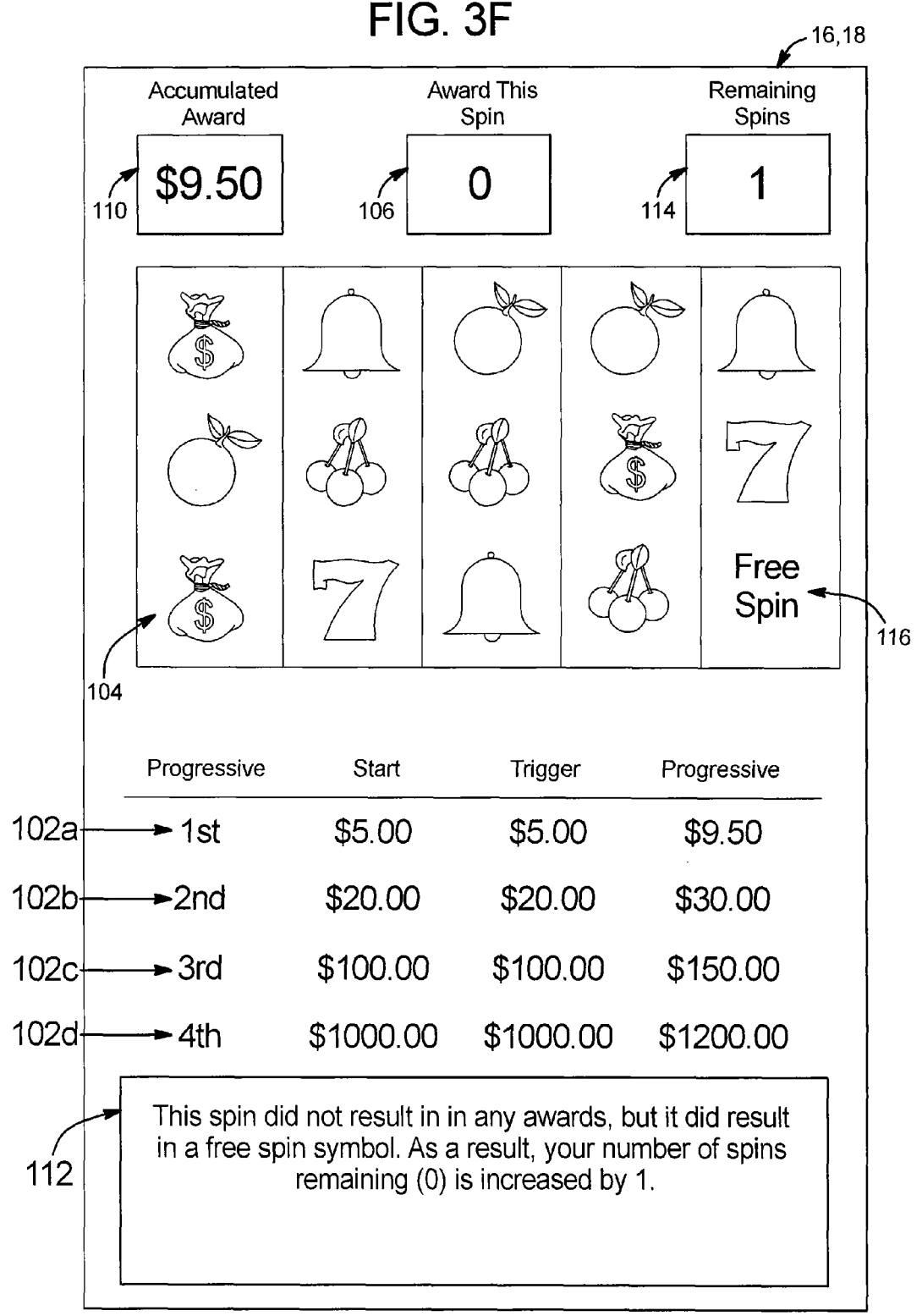
FIG. 3F is a front view of a display showing the result a third spin of a bonus game of one embodiment in which a free spin symbol is generated.

It should also be noted that in other embodiments, the player can win additional spins during play of the secondary or bonus game. For example, FIG. 3F shows the result of the third spin, following the spin shown in FIG. 3C, in which a free spin symbol 116 is generated instead of a terminator symbol. As explained in message area 112, the number of remaining spins is increased by one. As a result, remaining spins indicator 114 displays one spin remaining and the bonus game continues.

In other embodiments, a number of remaining spins is not maintained. Instead, the player is provided additional spins or activations until a game terminating condition (e.g., winning a top progressive award, a terminator symbol or combination being generated, a lack of one or more symbols or combinations being generated, etc.) occurs. In one embodiment, the player can win anti-terminators during play of the bonus game. If a player wins an anti-terminator and a terminator symbol is generated on a subsequent spin, the anti-terminator counters the effects of the terminator symbol, enabling the game to continue.

It should also be noted that in an alternative embodiment, the relationships between symbols or combinations and awards are different in the primary and bonus games. For example, three cherry symbols on a payline is associated with an award of $10 in the primary game, but only $1.25 in the game.

In one embodiment, if a player wins a progressive award but the progressive award is lower than the total award value, the total award value is not set to the progressive award value. For example, if both the trigger value and the progressive award value for a progressive award are $5 and the total award value is $5.75, the player wins the progressive award. However, the total award value is not set to $5.

Figure 3G:
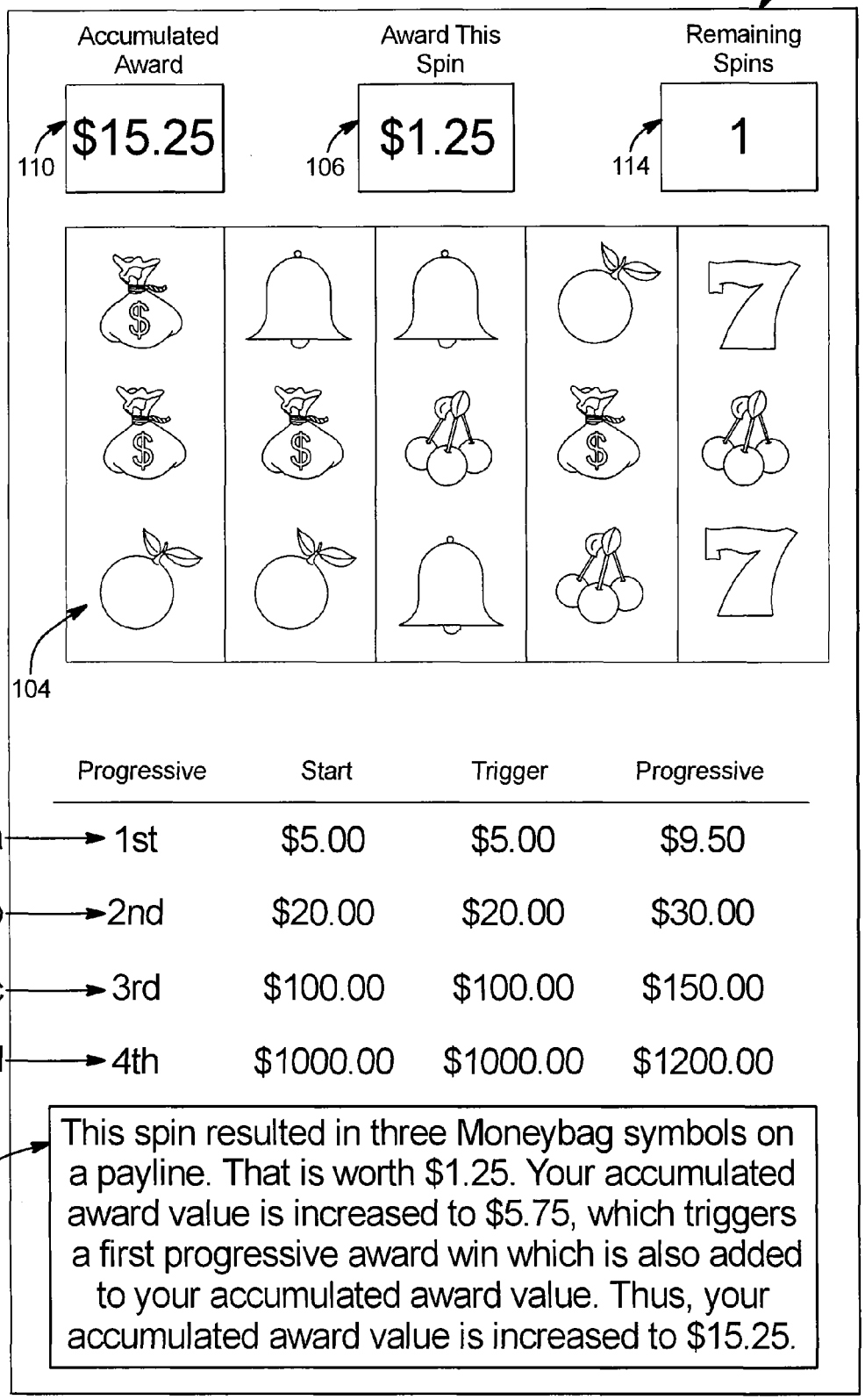
FIG. 3G is a front view of a display showing the result a second spin of a bonus game of one embodiment in which the progressive award value is added to the total award value.

In another embodiment, instead of increasing the player's total award value to the progressive award value, the total award value is increased by the progressive award value. For example, FIG. 3G shows the result of the second spin of the bonus game, similar to FIG. 3C, in which the progressive award value is added to the total award value. Because the total award value ($5.75) is increased by the first progressive award ($9.50), the total award indicator 110 displays a value of $15.25.

In another embodiment, the amount by which the trigger value is exceeded (e.g., $0.75 in FIG. 3C) is added to the total award value after the total award value is set to the progressive award value. As a result, the total award value shown in FIG. 3C would become $10.25. In different embodiments, the total award value is increased when a progressive award is won by another suitable amount, including but not limited to: a predetermined amount which is not dependent on a progressive award value, a randomly determined amount within a range of amounts, a percentage or portion of the difference between the total award value and the next trigger value, a predetermined amount less than the difference between the total award value and the next trigger value, a percentage or portion of the progressive award value won or a percentage or portion of the total award value.

In another embodiment, the amount by which the trigger value is exceeded funds the start up value for the next progressive award level. In another embodiment, the amount by which the trigger value is exceeded funds the start up value for the player's previous progressive award level (i.e., the progressive award level associated with the recently reached trigger value). In another embodiment, the amount by which the trigger value is exceeded is provided to the player in addition to any progressive award value. In another embodiment, the amount of the player's total award value (prior to being increased to a progressive award value upon reaching an appropriate trigger value) funds the start up value for the player's previous progressive award level. In another embodiment, the amount of the player's total award value (prior to being increased to a progressive award value upon reaching an appropriate trigger value) funds the start up value for the next progressive award level.

Figure 3H:
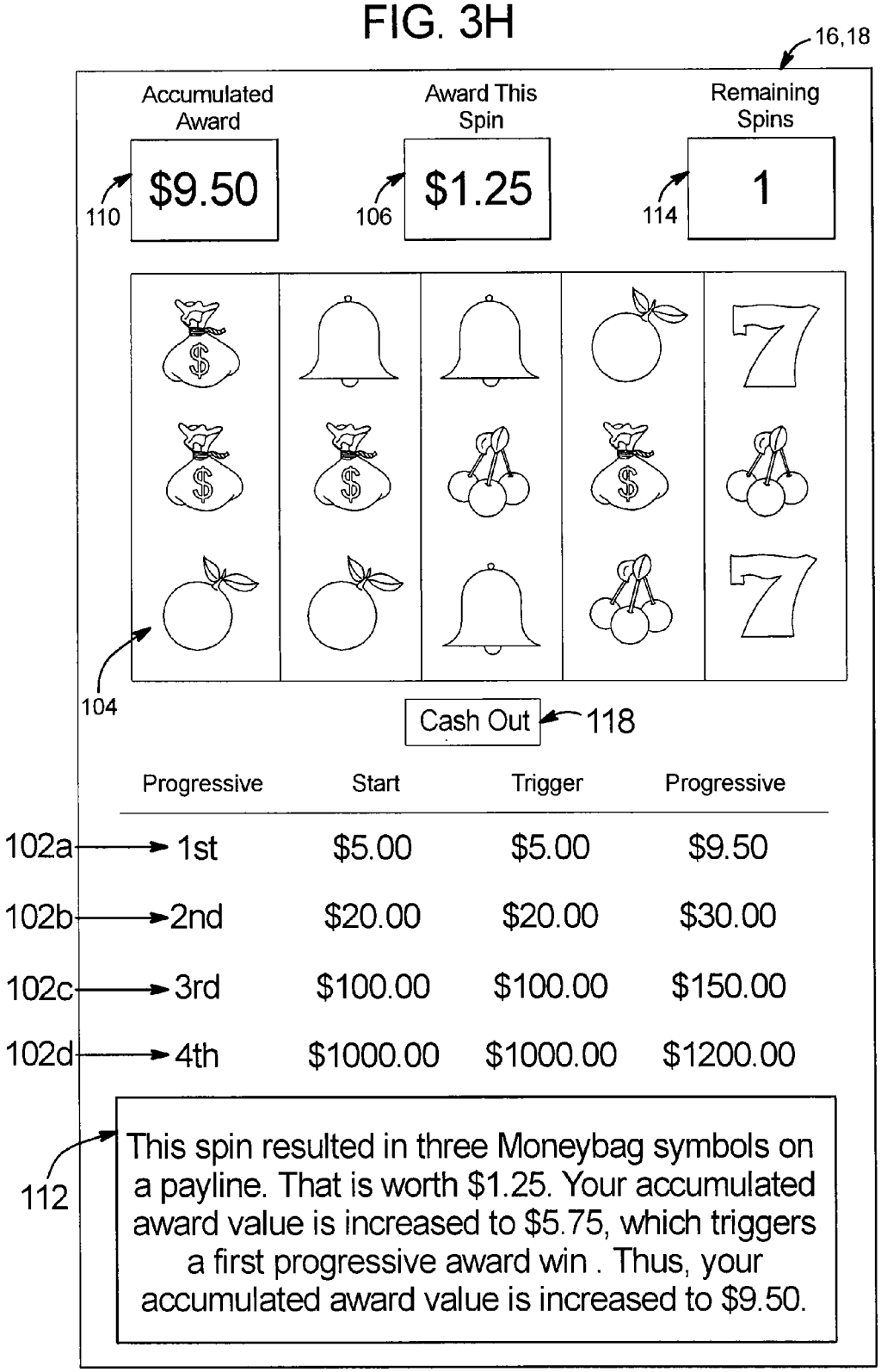
FIG. 3H is a front view of a display showing the result a second spin of a bonus game of one embodiment in which the player is provided with an opportunity to end the game by pressing a cash out button.
Figure 3I:
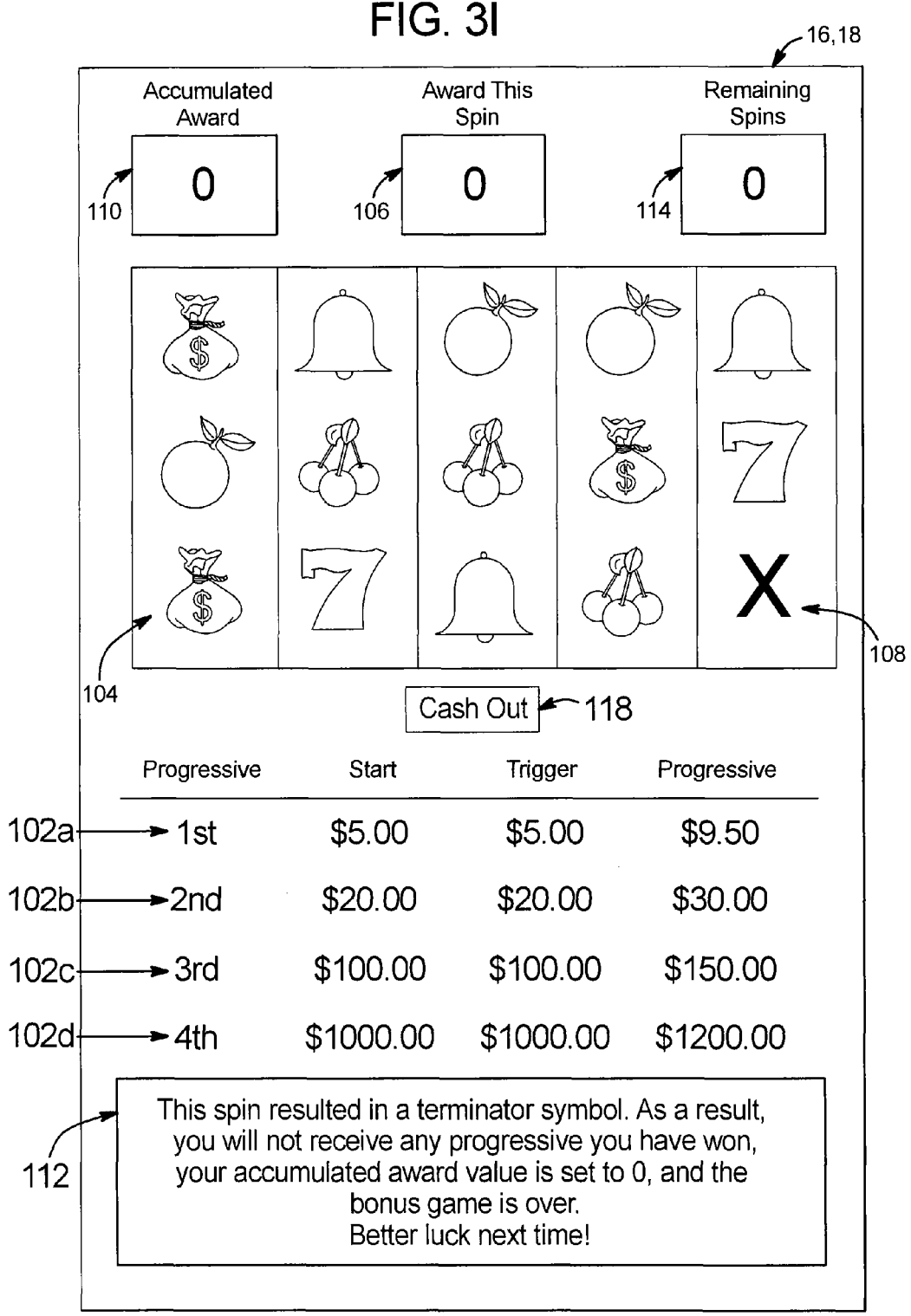
FIG. 3I is a front view of a display showing the result a third spin of a bonus game of one embodiment in which the player is not provided a progressive award won on a previous spin.

In another embodiment, progressive awards won in the bonus game are not necessarily provided to the player before another spin or at any other time in the game. For example, a terminator symbol or combination can, in addition to ending the game, eliminate any progressive awards won during the game. In one embodiment having such a terminator, a player is provided an opportunity to end the game and receive any accumulated awards before making another spin. For example, FIGS. 3H and 3I show spins similar to the spins shown in FIGS. 3C and 3D, except that the player is provided with an opportunity to end the game by pressing cash out button 118 instead of spinning again. Further, as explained in message area of FIG. 3I, because the terminator symbol 108 was generated, the first progressive award is not provided to the player. Instead, the first progressive award is not reset to its startup value and remains winnable by this or another player in the future.

In various embodiments, any suitable amount, including zero, is provided to the player at the end of the bonus game. For example, even if a player loses all progressive awards won during the bonus game, the player is provided $5. In another embodiment, the player loses any progressive award won during the bonus game if the player wins a progressive award, decides to continue playing for the next progressive award and fails to win the next trigger award. The player is provided the opportunity to decide whether to proceed after each progressive award is won, enabling the player to consider the amount needed to reach the next progressive award and the size of the next progressive award when making the determination.

Figure 3J:
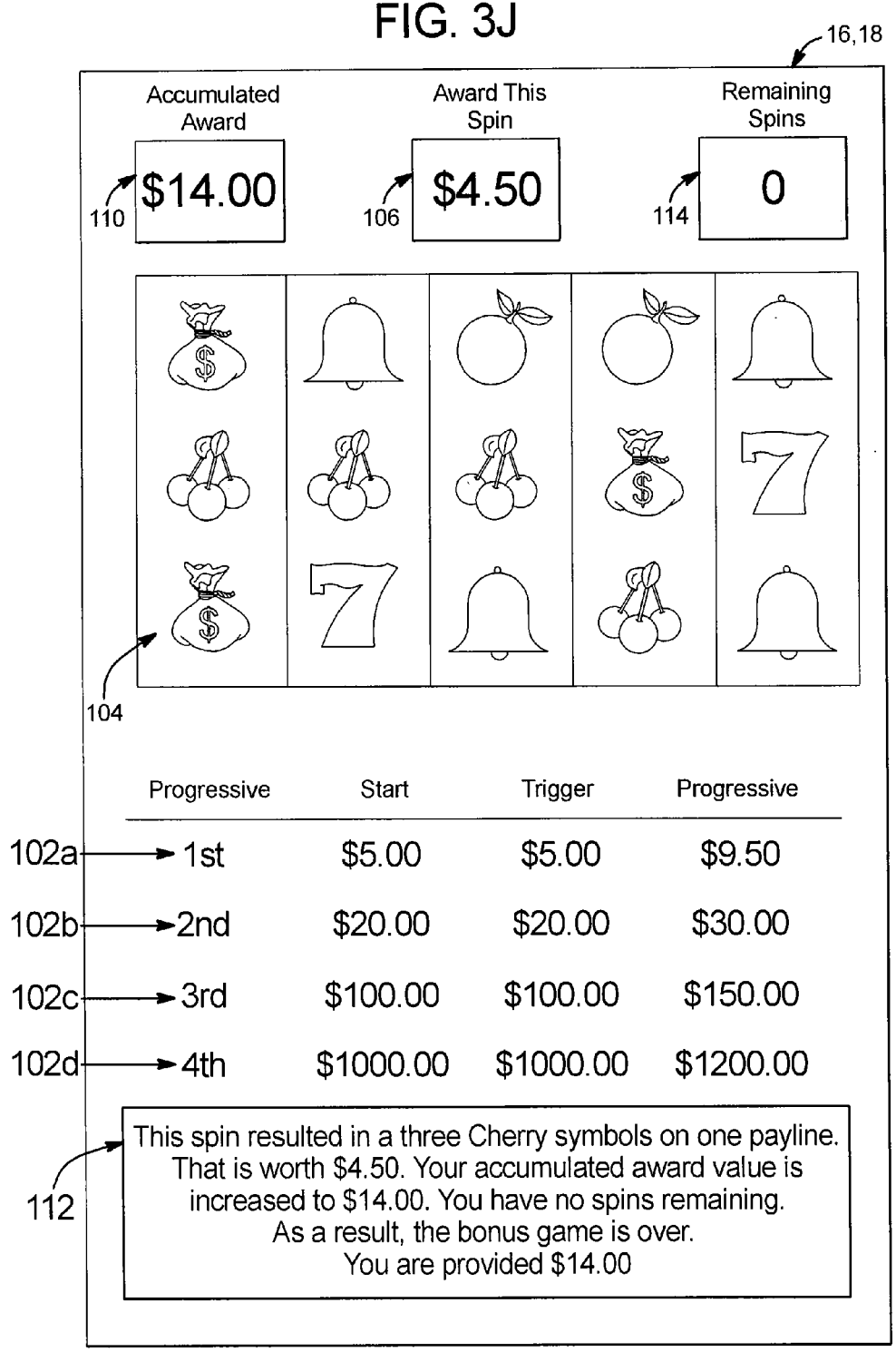
FIG. 3J is a front view of a display showing the result a third spin of a bonus game of one embodiment in which the total award value is provided to the player

In different embodiments, the total award value is provided to the player instead of or in addition to any progressive award won during the bonus game. For example, FIG. 3J shows an alternative result of the third spin of the bonus game of FIG. 3C. The spin results in three cherry symbols on one payline. As explained in message area 112 and displayed in award this spin indicator 106, the award for this spin is $4.50. As a result, the total award value ($9.50) is increased to $14; however, the total award value is not greater than or equal to the trigger value ($20) of the second progressive award. Further, as shown in remaining spins indicator 114, no spins remain. Thus, the bonus game ends and the total award value is provided to the player. In another embodiment, the higher of the progressive award and the total award value is provided to the player.

Figure 3K:
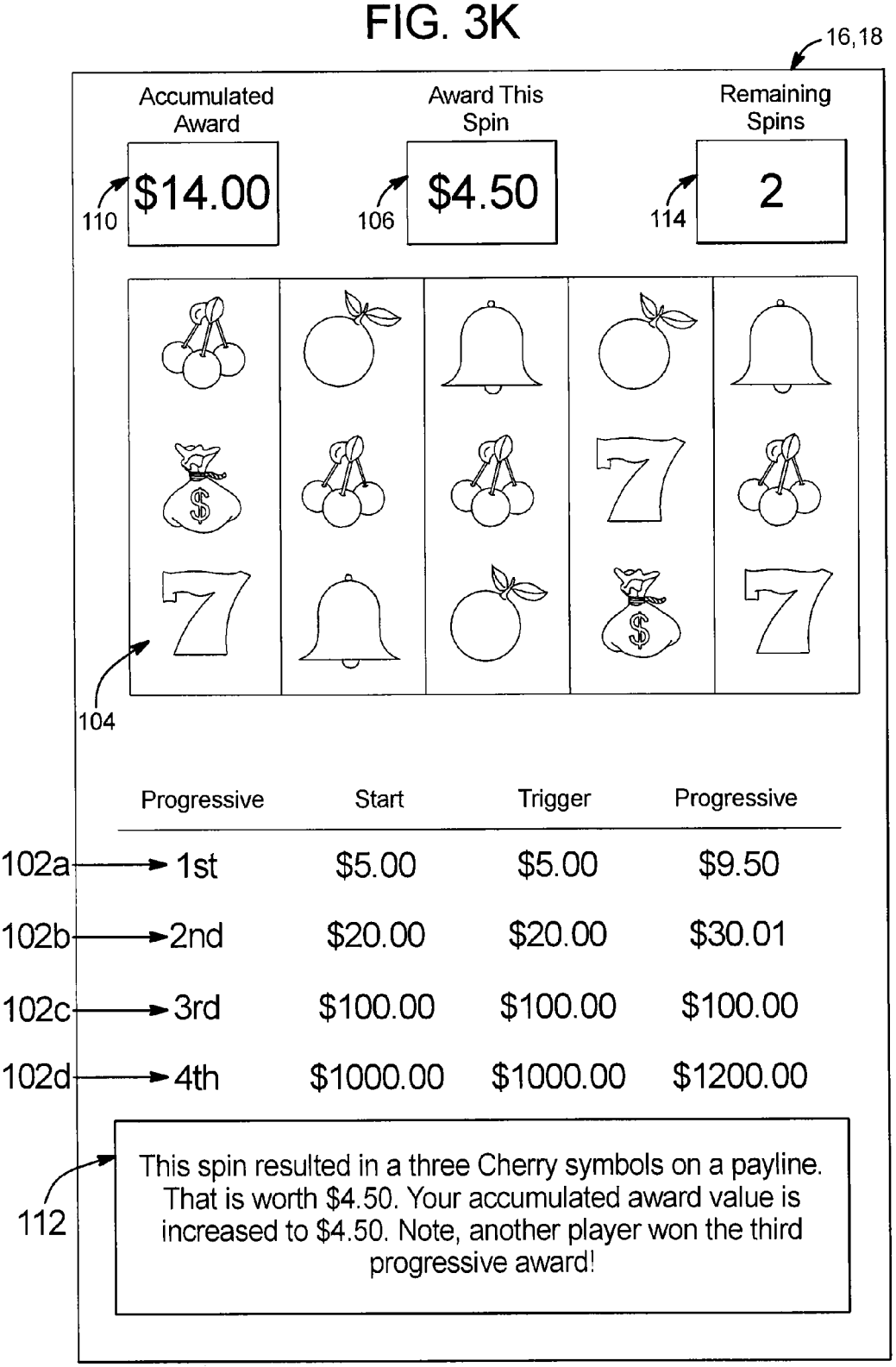
FIG. 3K is a front view of a display showing the result of a first spin of a bonus game of one embodiment in which the second progressive award value is increased and the third progressive award value is reset.

It should be noted that in one embodiment, one or more of the progressive award values can be increased (e.g., increased due to another player's wager) or decreased (e.g., reset when won by another player) during the bonus game. For example, FIG. 3K shows an alternative result of a first spin following FIG. 3A. The second progressive award value is increased to $30.01, and the third progressive award value is reset to $100.00.

Figure 3L:
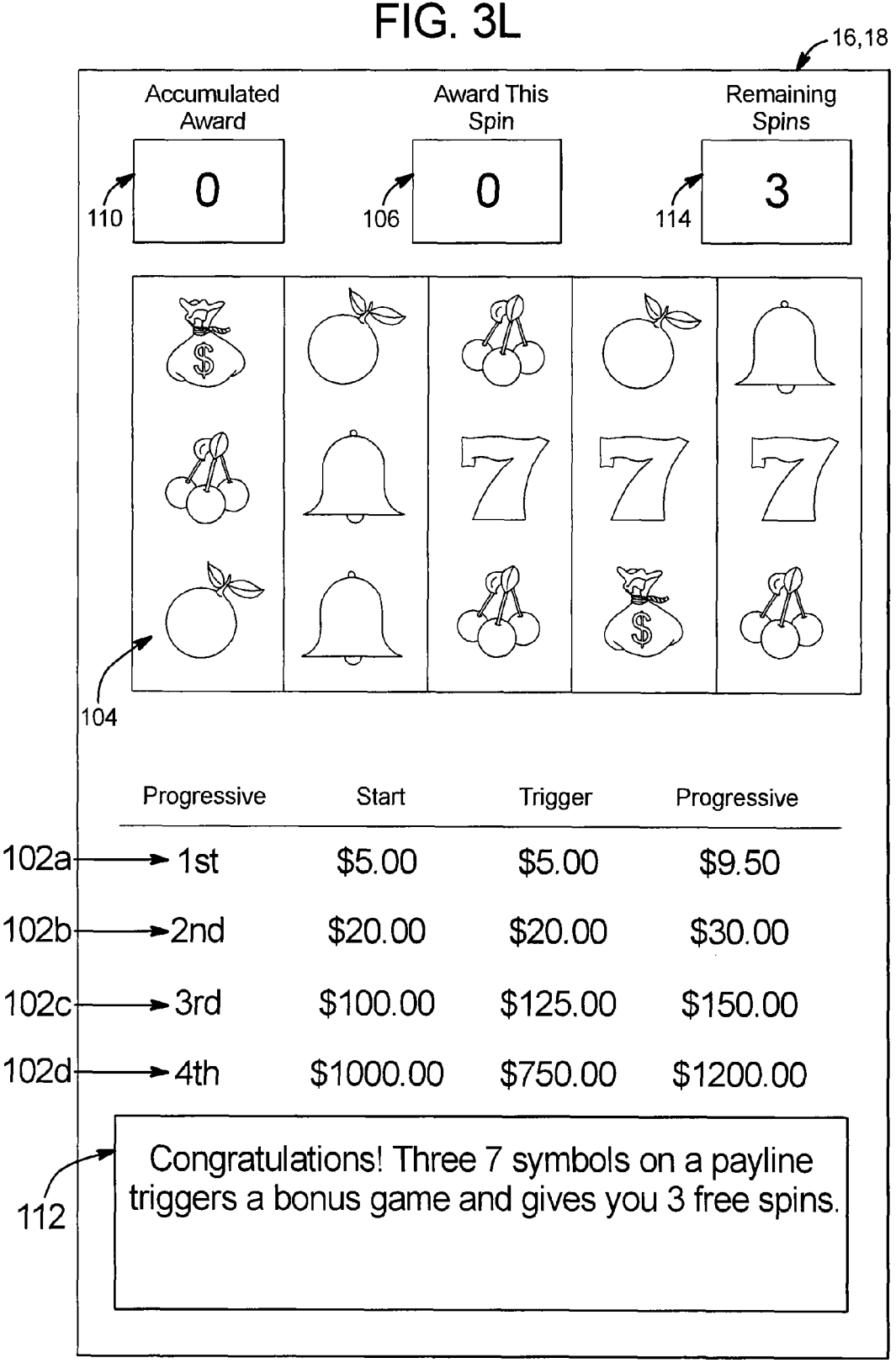
FIG. 3L is a front view of a display at the start of a bonus game of one embodiment in which a trigger value of a progressive award is independent of the start value of the progressive award.

In one embodiment, the trigger value for a progressive award is independent of the startup value. For example, in FIG. 3L, the fourth progressive award has a startup value of $1000.00 and a trigger value of $750.00. Similarly, the third progressive award has a startup value of $100.00 and a trigger value of $125.00.

In one embodiment, a player is only provided one of the progressive awards won (or qualified for) during the game. For example, if after the spin result illustrated in FIG. 3C, a subsequent spin resulted in at least $11.50 in awards, the player would win the second progressive prize. Assuming the bonus game ends before the total award value reaches $100, the player is provided the second progressive award value ($30) and not the first progressive award value ($9.50). As a result, the second progressive award value is reset to $20 and the first progressive award value remains $9.50.

In one embodiment, at least one progressive award is associated with a maximum value. The maximum value can be any suitable value, including but not limited to a startup value of a progressive award that is higher in the hierarchy. In an example embodiment similar to the one illustrated in FIG. 3A, the maximum value for the first progressive award is $20, the maximum value for the second progressive award is $100, the maximum value for the third progressive award is $1000 and the fourth progressive award has no maximum value.

In various embodiments, after a progressive award value is incremented to its maximum value, additional values which would otherwise increment the progressive award value are allocated for different uses. For example, the additional values are stored for later use to fund the startup value of this or another progressive award. Alternatively, the additional values or a portion of the additional values fund an increase in the startup value for some progressive award. For example, before the maxed-out second progressive award is won, $15 is accumulated from the additional values. Instead of the second progressive award being reset upon being awarded to its startup value of $20, it is reset to $35. In another embodiment, the additional values are added to the progressive value of the next non-maxed-out progressive award in the hierarchy. For example, if a wager would cause $0.05 to be added to the first progressive award, but the first and second progressive award values are at their respective maximum values, the $0.05 is added to the third progressive award value.

In an alternative embodiment, the trigger value necessary to win a progressive award is dependent upon the total award value at some point in the bonus game. For example, the trigger value for a second progressive award is $25 more than the total award value when the first progressive award is won. In this example, the first progressive award value is $15, and the trigger value for the first progressive award is $10. If the player wins the first progressive award by having a total award value of $10 and the total award value becomes $25 ($10+$15), the player must reach at least a total award value of $50 to win the second progressive award. If instead, the player wins the first progressive award by having a total award value of $10.75 and the total award value becomes $25.75 ($10.75+$15), the player must reach at least a total award value of $50.75 to win the second progressive award. It should be noted that the trigger amount can be dependent in any suitable manner upon the total award value at some point in the bonus game, including but not limited to: being a fixed amount higher, being a fixed percentage higher or being a randomly generated amount (or percentage) within a range of amounts higher.

In one embodiment, total award values persist for use in a later played game. In one embodiment, a persistent total award value is associated with an individual player. As a result, the player is able to accumulate awards values in a bonus game, save the total award value, stop playing for a period of time, return to playing and not lose the total award value the player previously won. Alternatively, the persistent total award values are associated with a gaming device. As a result, if a first player accumulates a total award value in a bonus game of a gaming device and then stops playing, the total award value is stored. The next player to play the bonus game on the gaming device plays using the total award value previously accumulated by the first player.

In one embodiment, when a player wins a progressive award, other player's total award values are reduced. In another embodiment, when a player wins a progressive award, the trigger value for one or more progressive awards is increased. As a result, a player that is close to having a high enough total award value to win a progressive award is encouraged to continue playing. Otherwise, the player risks becoming further away from winning the progressive award when another player wins a progressive award.

In one embodiment, a player is able to win a progressive prize if the player accumulates a trigger amount of award values within a time frame. For example, if a player accumulates $50 in an hour, the player wins a first progressive prize. Similarly, if the player accumulates $250 in an hour, the player wins a second progressive prize. In one embodiment, only one time frame per player is active at one time. For example, a player needs to accumulate $50 in an hour to win a progressive prize. At the start of the hour, the player accumulates $5. However, the player does not accumulate any additional awards until the last five minutes of the hour, when the player accumulates an additional $40. At the end of the hour, the player only has $45 and a new hour begins. Even if the player accumulates an additional $10 in the first five minutes of the next hour, the player does not win the progressive prize.

In an alternative embodiment, a player is able to win a progressive award by accumulating a trigger amount of award values in any time frame. In the above example, after accumulating the $10, the player would have accumulated $50 within an hour and would therefore win a progressive award.

In another embodiment, the server based game includes tournament play. Prizes are arranged in a hierarchy and include cash prizes or other items. A player moves up the prize hierarchy by increasing his or her total award value. Further, when a player reaches the next prize level, the player's total award value is increased based on the prize won at that level (e.g., all or a portion of a progressive award value for the level) or any other suitable value.

Figure 4:
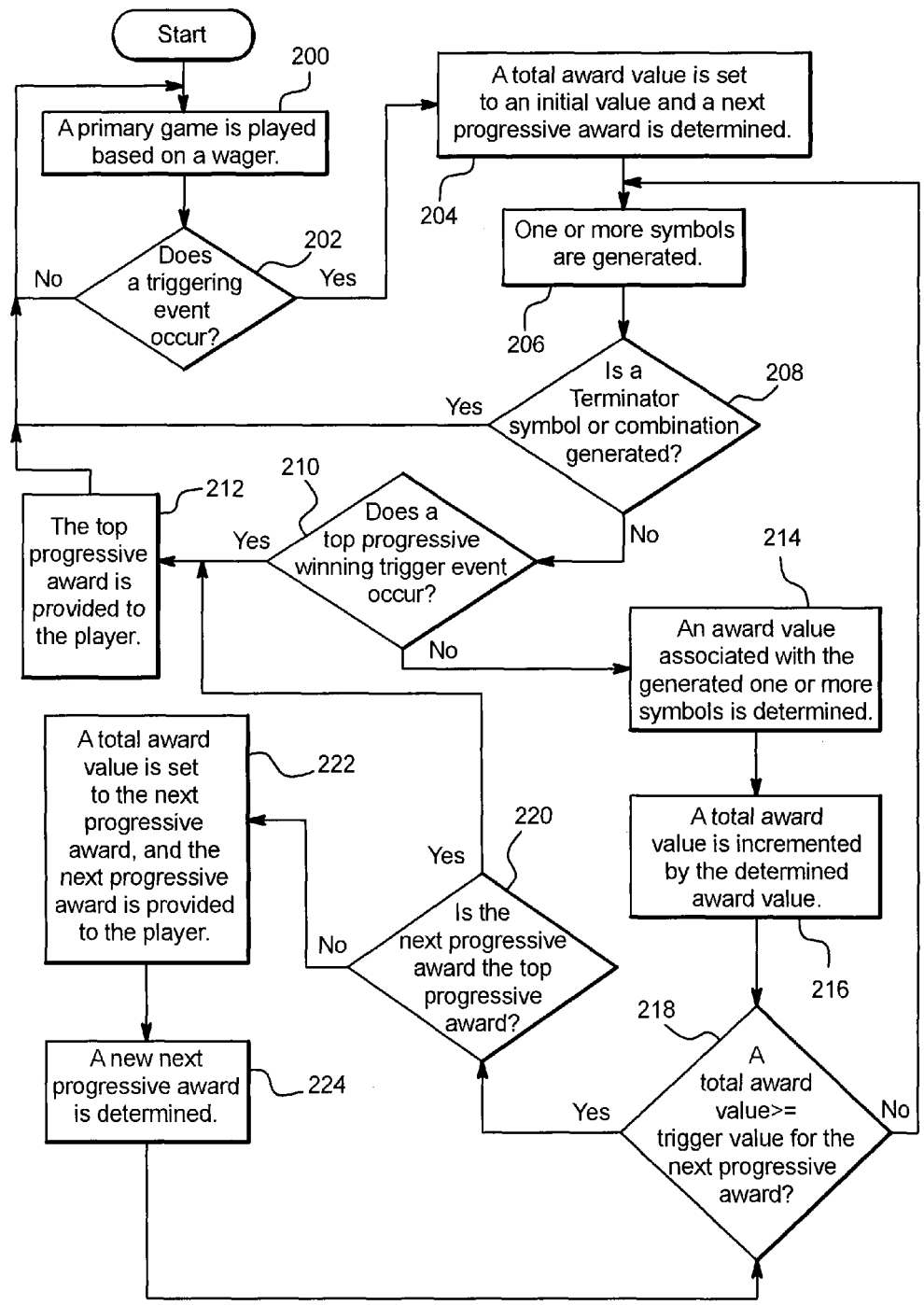
FIG. 4 is a flowchart showing the process of operating a gaming device in which progressive awards are provided to a player when a total award value in a bonus game is greater than or equal to a startup value for the progressive award and in which the total award value is set to the progressive award when the progressive award is won in accordance with one embodiment.

FIG. 4 illustrates the process of operating a gaming device in which progressive awards are provided to a player when a total award value in a bonus game is greater than or equal to a trigger value for the progressive award and in which the total award value is set to the progressive award when the progressive award is won in accordance with one embodiment. At step 200, a primary game is played based on a wager. At step 202, it is determined whether a triggering event occurs. The triggering event can be any suitable triggering event, including but not limited to those already described above. If the triggering event does not occur, the process repeats at step 200.

If the triggering event occurs, at step 204, a total award value is set to an initial value (e.g., zero or a progressive award value) and a next progressive award is determined. For example, if no progressive award has been won during the bonus game, the first progressive award is the next progressive award. Similarly, if the first progressive award has already been won in this play of the bonus game but the second progressive award has not, the second progressive award is the next progressive award, and so on. At step 206, one or more symbols are generated. At step 208, it is determined whether a terminator symbol or combination is generated. If a terminator symbol is generated, the process repeats at step 200.

If a terminator symbol is not generated, at step 210, it is determined whether a top progressive winning trigger event occurs. The top progressive winning trigger event can be any suitable trigger, including but not limited to a symbol combination being generated. If a top progressive winning trigger event occurs, at step 212, the top progressive award is provided to the player and the process repeats at step 200.

If a top progressive winning trigger event does not occur, at step 214, an award value associated with the generated one or more symbols is determined. At step 216, the total award value is incremented by the determined award value. At step 218, it is determined whether the total award value is greater than or equal to the trigger value for the next progressive award in the progressive award hierarchy. If the total award value is less than the trigger value for the next progressive award, the process repeats at step 206.

If the total award value is greater than or equal to the trigger value for the next progressive award in the progressive award hierarchy, at step 220, it is determined whether the next progressive award is the top progressive award. If the next progressive award is the top progressive award, the process continues at step 212.

If the next progressive award is not the top progressive award, at step 222, the total award value is set to the next progressive award, and the next progressive award is provided to the player. In other words, the player wins the next progressive award and the total award value is increased to that progressive award value. At step 224, a new next progressive award is determined and the process repeats at step 218.

In an alternative embodiment, if the total award value is already greater than the next progressive award value (e.g., the progressive value is $20.25, the trigger value is $20, and the total award value after being incremented by the spin result is $20.50), at step 222 the total award value is not set to the progressive value. Instead, the total award value is not changed. In an alternative embodiment, the total award value is incremented by any suitable value, such as the award value of one or more of the previous spins.

Figure 5:
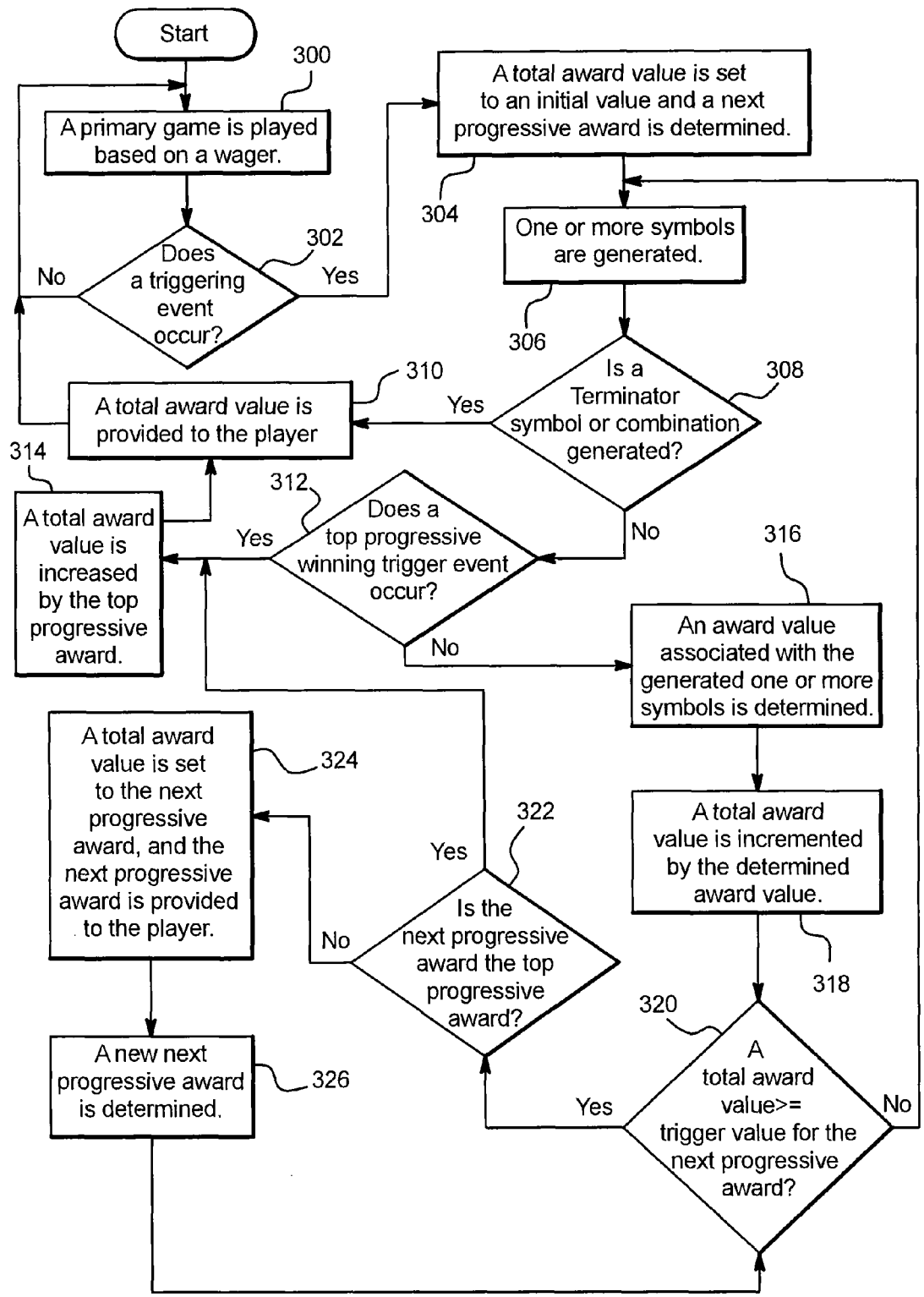
FIG. 5 is a flowchart showing the process of operating a gaming device in which a total award value is provided to a player at the end of a bonus game and in which a total award value is incremented by a progressive award value when the total award value is greater than or equal to a startup value for the progressive award in accordance with one embodiment.

FIG. 5 illustrates the process of operating a gaming device in which a total award value is provided to a player at the end of a bonus game and in which a total award value is incremented by a progressive award value when the total award value is greater than or equal to a trigger value for the progressive award in accordance with one embodiment. At step 300, a primary game is played based on a wager. At step 302, it is determined whether a triggering event occurs. The triggering event can be any suitable triggering event, including but not limited to those already described above. If the triggering event does not occur, the process repeats at step 300.

If the triggering event occurs, at step 304, a total award value is set to an initial value (e.g., zero or a progressive award value) and a next progressive award in the progressive award hierarchy (e.g., the lowest progressive award) is determined. At step 306, one or more symbols are generated. At step 308, it is determined whether a terminator symbol or combination is generated. If a terminator symbol is generated, at step 310, the total award value is provided to the player and the process repeats at step 300.

If a terminator symbol is not generated, at step 312, it is determined whether a top progressive winning trigger event occurs. The top progressive winning trigger event can be any suitable trigger, including but not limited to a symbol combination being generated. If a top progressive winning trigger event occurs, at step 314, the total award value is increased by the top progressive award and the process continues at step 310.

If a top progressive winning trigger event does not occur, at step 316, an award value associated with the generated one or more symbols is determined. At step 318, the total award value is incremented by the determined award value. At step 320, it is determined whether the total award value is greater than or equal to the trigger value for the next progressive award in the progressive award hierarchy. If the total award value is less than the trigger value for the next progressive award, the process repeats at step 306.

If the total award value is greater than or equal to the trigger value for the next progressive award in the progressive award hierarchy, at step 322, it is determined whether the next progressive award is the top progressive award. If the next progressive award is the top progressive award, the process continues at step 314.

If the next progressive award is not the top progressive award, at step 324, the total award value is increased by the next progressive award. At step 326, a new next progressive award is determined and the process repeats at step 320.

In an alternative embodiment, a progressive award is won based on a total award value only when the total award value is exactly equal to the trigger value associated with the progressive award. A player is provided with the opportunity to accumulate awards to produce a total award value as described above or in any other suitable manner. If the total award value is equal to the trigger value associated with one of the progressive awards in the hierarchy, the player wins that progressive award. In various embodiments, the total award value is set to or incremented by a progressive award if that progressive award is won. In another embodiment, the total award value is not increased based on the progressive award value.

In one embodiment, the game ends if the total award value exceeds the trigger value associated with the top progressive award. For example, if the value associated with the top progressive award is $100 and the total award value is $105, the game ends. In another embodiment, rather than the game ending when a total award value exceeds the trigger value associated with the top progressive award, the total award value is reset to an initial value. In still another embodiment, the total award value is set to the amount the total award value exceeds the trigger value associated with the top progressive award. For example, if the trigger value associated with the top progressive award is $100 and the total award value is $105, the total award value is set to $5.

In one embodiment, the game has a progressive award for every possible total award value within a range of values. For example, one hundred one progressive awards are associated with trigger values ranging from $0.00 to $1.00 in $0.01 increments.

In one embodiment, the frequencies of occurrences of individual awards are set such that one of the progressive awards is less likely to be won than another progressive award during the play of the bonus game. In an example, the probability of a spin resulting in an award of $0.00 is one in ten million. Consequently, the lowest progressive award in the hierarchy (e.g., the progressive award with a trigger value of $0.00) is won infrequently and only on the first spin of a bonus game. As a result, the lowest progressive award can increase in value to being higher than other available progressive awards. Further, because the lowest progressive award would be winnable on the first spin or activation provided to a player, the player's excitement during that first spin is increased compared to when only smaller progressive awards can be won on the first spin or activation.

An example embodiment has one hundred one progressive awards, associated with trigger values of $0.00 to $1.00. The trigger value is the same as the startup value for each progressive award. The maximum award that can be accumulated on any one spin is $0.75, and the minimum is $0.00. As a result, the player will win at least one progressive award during play of the bonus game unless a terminator symbol or combination is generated. As described above, the probability of a spin generating an award of $0.00 is one in ten million. As a result, the progressive prize associated with the trigger value of $0.00 is likely to grow large over time. Because the large prize, possibly the largest of the progressive awards, is winnable on the first spin of the bonus game, a player's excitement and interest in playing the game is increased.

In this embodiment, if a progressive award is won, the total award value is set to the progressive award. If the new total award value is equal to the trigger value for another progressive award, the other progressive award is also provided. For example, if the total award value is $0.25, and the progressive award associated with a trigger of $0.25 has a progressive award value of $1.00, the total award value is set to $1.00, and the progressive award associated with the trigger value of $1.00 is also provided to the player.

Figure 6:
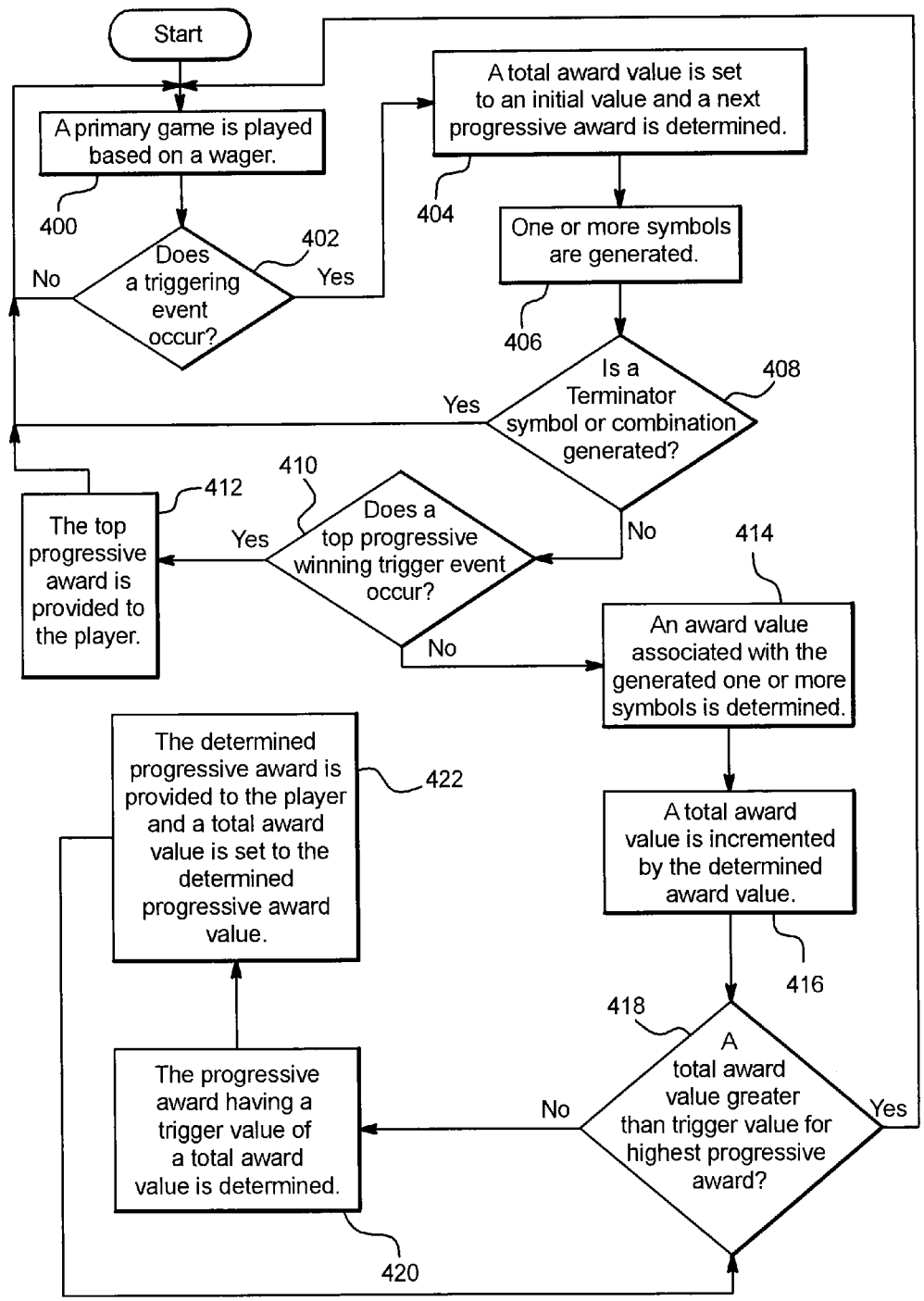
FIG. 6 is a flowchart showing the process of operating a gaming device in which progressive awards are provided to a player when a total award value in a bonus game is equal to a startup value for the progressive award and in which the total award value is set to the progressive award when the progressive award is won in accordance with one embodiment.

FIG. 6 illustrates the process of operating a gaming device in which progressive awards are provided to a player when a total award value in a bonus game is equal to a trigger value for the progressive award and in which the total award value is set to the progressive award value when the progressive award is won in accordance with one embodiment. At step 400, a primary game is played based on a wager. At step 402, it is determined whether a triggering event occurs. The triggering event can be any suitable triggering event, including but not limited to those already described above. If the triggering event does not occur, the process repeats at step 400.

If the triggering event occurs, at step 404, a total award value is set to an initial value (e.g., zero). At step 406, one or more symbols are generated. At step 408, it is determined whether a terminator symbol or combination is generated. If a terminator symbol is generated, the process repeats at step 400.

If a terminator symbol is not generated, at step 410, it is determined whether a top progressive winning trigger event occurs. The top progressive winning trigger event can be any suitable trigger, including but not limited to a symbol combination being generated. If a top progressive winning trigger event occurs, at step 412, the top progressive award (in this embodiment, the progressive award with the highest progressive award value regardless of the trigger value) is provided to the player and the process repeats at step 400.

If a top progressive winning trigger event does not occur, at step 414, an award associated with the generated one or more symbols is determined. At step 416, the total award value is incremented by the determined award. At step 418, it is determined whether the total award value is greater than the trigger value for the highest progressive award in the progressive award hierarchy. If the total award value is greater than the trigger value for the highest progressive award, the process repeats at step 400.

If the total award value is less than or equal to the trigger value for the highest progressive award in the progressive award hierarchy, at step 420, the progressive award having a trigger value of the total award value is determined. At step 422, the determined progressive award is provided to the player and the total award value is set to the determined progressive award and the process repeats at step 418.

Figure 7:
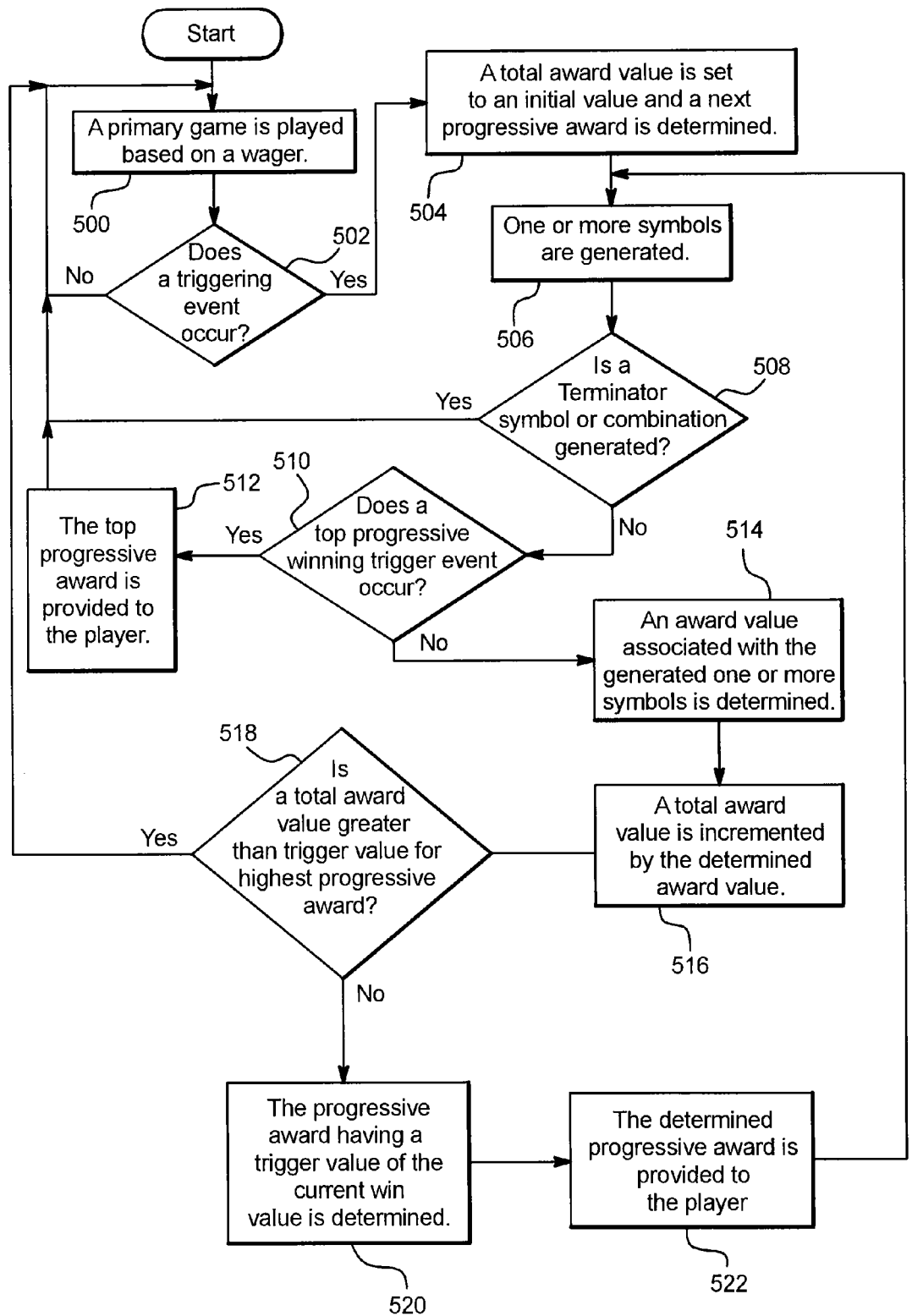
FIG. 7 is a flowchart showing the process of operating a gaming device in which progressive awards are provided to a player when a total award value in a bonus game is equal to a startup value for the progressive award and in which the total award value is only incremented in response to award values generated in a spin in accordance with one embodiment.

In one embodiment, the accumulated progressive award is only increased based on awards generated in a spin. For example, if a progressive award is won, the total award value is unaffected by the progressive award win. FIG. 7 illustrates the process of operating a gaming device in which progressive awards are provided to a player when a total award value in a bonus game is equal to a trigger value for the progressive award and in which the total award value is only incremented in response to awards generated in a spin in accordance with one embodiment. At step 500, a primary game is played based on a wager. At step 502, it is determined whether a triggering event occurs. The triggering event can be any suitable triggering event, including but not limited to those already described above. If the triggering event does not occur, the process repeats at step 500.

If the triggering event occurs, at step 504, a total award value is set to an initial value (e.g., zero). At step 506, one or more symbols are generated. At step 508, it is determined whether a terminator symbol or combination is generated. If a terminator symbol is generated, the process repeats at step 500.

If a terminator symbol is not generated, at step 510, it is determined whether a top progressive winning trigger event occurs. The top progressive winning trigger event can be any suitable trigger, including but not limited to a symbol combination being generated. If a top progressive winning trigger event occurs, at step 512, the top progressive award is provided to the player and the process repeats at step 500.

If a top progressive winning trigger event does not occur, at step 514, an award associated with the generated one or more symbols is determined. At step 516, the total award value is incremented by the determined award. At step 518, it is determined whether the total award value is greater than the trigger value for the highest progressive award in the progressive award hierarchy. If the total award value is greater than the trigger value for the highest progressive award, the process repeats at step 500.

If the total award value is less than or equal to the trigger value for the highest progressive award in the progressive award hierarchy, at step 520, the progressive award having a trigger value of the total award value is determined. At step 522, the determined progressive award is provided to the player and the process repeats at step 506.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:
a housing;

a plurality of input devices supported by the housing, said plurality of input devices including:
  (i) an acceptor of a first physical item associated with a first monetary value,
  (ii) a validator configured to identify the first physical item, and
  (iii) a cashout device configured to receive an input to cause an initiation of a payout associated with a credit balance;
a display device supported by the housing;
a processor; and
a memory device which stores a plurality of instructions, which when executed by the processor, cause the processor to operate with the display device and the plurality of input devices to, for each play of a game:
  (a) set a total award value to an initial value;
  (b) display the set total award value;
  (c) display at least one of a plurality of symbols;
  (d) determine any award values associated with the displayed symbols;
  (e) increase the total award value by any of said determined award values;
  (f) display the increased total award value; and
  (g) if the total award value is greater than or equal to a first trigger value:
    (i) increase the total award value based on a first progressive award value, said increase occurring independent of any additional determination to provide said first progressive award value to a player,
    (ii) display the increased total award value, and
    (iii) determine whether the increased total award value is greater than or equal to a second trigger value associated with a second progressive award value.

2. The gaming device of claim 1, wherein the first trigger value is a startup value for the first progressive award value.

3. The gaming device of claim 1, wherein when executed by the processor, the plurality of instructions cause the processor to set the total award value to the second progressive award value if the total award value is greater than or equal to the second trigger value.

4. The gaming device of claim 3, wherein the second trigger value is a startup value for the second progressive award value.

5. The gaming device of claim 1, wherein when executed by the processor, the plurality of instructions cause the processor to increase the total award value by the second progressive award value if the total award value is greater than or equal to the second trigger value.

6. The gaming device of claim 5, wherein the second trigger value is a startup value for the second progressive award.

7. The gaming device of claim 1, wherein when executed by the processor, the plurality of instructions cause the processor to provide the second progressive award value if the total award value is greater than or equal to the second trigger value.

8. The gaming device of claim 1, wherein when executed by the processor, the plurality of instructions cause the processor to terminate a game when a terminator symbol is generated.

9. The gaming device of claim 1, wherein when executed by the processor, the plurality of instructions cause the processor to increase the total award value based on the first progressive award value by setting the total award value to the first progressive award value.

10. The gaming device of claim 1, wherein when executed by the processor, the plurality of instructions cause the processor to increase the total award value based on the first progressive award value by increasing the total award value by the first progressive award value.

11. The gaming device of claim 1, wherein the second progressive award is a top progressive award and wherein when executed by the processor, the plurality of instructions cause the processor to provide the second progressive award if a top progressive award winning symbol is generated.

12. The gaming device of claim 1, wherein the initial value is zero.

13. The gaming device of claim 1, wherein when executed by the processor, the plurality of instructions cause the processor to provide at least the first progressive award value.

14. The gaming device of claim 1, wherein when executed by the processor, the plurality of instructions cause the processor to provide the higher of the first progressive award value and the second progressive award value if the total award value is greater than or equal to the second trigger value.

15. The gaming device of claim 14, wherein when executed by the processor, the plurality of instructions cause the processor to provide the higher of the first progressive award value and the second progressive award value without providing the lower of the first progressive award value and the second progressive award value if the total award value is greater than or equal to the second trigger value.

16. A gaming device comprising:
a housing;
a plurality of input devices supported by the housing, said plurality of input devices including:
  (i) an acceptor of a first physical item associated with a first monetary value,
  (ii) a validator configured to identify the first physical item, and
  (iii) a cashout device configured to receive an input to cause an initiation of a payout associated with a credit balance;
a display device supported by the housing;
a processor; and
a memory device which stores a plurality of instructions, which when executed by the processor, cause the processor to operate with the display device and the plurality of input devices to, for each play of a game:
  (a) set a total award value to an initial value;
  (b) display the set total award value at the initial value;
  (c) cause the display of at least one of a plurality of symbols;
  (e) determine any award values associated with the displayed symbols;
  (e) increase the total award value by any of said determined award values;
  (f) display the increased total award value;
  (g) determine whether the increased total award value is at least equal to a first predetermined trigger value associated with a first one of a plurality of progressive award values; and
  (h) if the determination is that the total award value is at least equal to the first predetermined trigger value associated with the first one of the plurality of progressive award values:
    (i) provide at least the first one of the plurality of progressive award values,
    (ii) automatically set the total award value to the provided progressive award value, (iii) display the set total award value at the provided progressive award value, and
(iv) determine whether the set total award value is equal to a second, different predetermined trigger value associated with a second one of the progressive award values.

17. The gaming device of claim 16, wherein each of the plurality of progressive award values is associated with one of a plurality of predetermined trigger values and when executed by the processor, the plurality of instructions cause the processor to end a game if the total award value is higher than all of the predetermined trigger values associated with the plurality of progressive award values.

18. The gaming device of claim 16, wherein each of the plurality of progressive award values is associated with one of a plurality of predetermined trigger values and when executed by the processor, the plurality of instructions cause the processor to reset the total award value to the initial value if the total award value is higher than all of the predetermined trigger values associated with the plurality of progressive award values.

19. The gaming device of claim 16, wherein when executed by the processor, the plurality of instructions cause the processor to provide the higher of the first and second ones of the progressive award values without providing the lower of the first and second ones of the progressive award values if the total award value is greater than or equal to the second predetermined trigger value.

20. A gaming system comprising
a controller, said controller programmed to manage a first progressive award value associated with a first predetermined trigger value and a second progressive award value associated with a second, different predetermined trigger value; and
at least one gaming device including:
  a housing;
  a plurality of input devices supported by the housing, said plurality of input devices including:
    (i) an acceptor of a first physical item associated with a first monetary value,
    (ii) a validator configured to identify the first physical item, and
    (iii) a cashout device configured to receive an input to cause an initiation of a payout associated with a credit balance;
  a display device supported by the housing; and
  a gaming device processor; and
  a memory device which stores a plurality of instructions, which when executed by the gaming device processor, cause the gaming device processor to operate with controller, the display device and the plurality of input devices to, for each play of a game:
    (a) set a total award value to an initial value;
    (b) display the set total award value at the initial value;
    (c) display at least one of a plurality of symbols;
    (d) determine any award values associated with the displayed symbols;
    (e) increase the total award value by any of said determined award values;
    (f) determine if the total award value is greater than or equal to the first predetermined trigger value; and
    (g) if the determination is that the total award value is greater than or equal to the first predetermined trigger value:
      (i) provide at least the first progressive award value,
      (ii) automatically increase the total award value based on the first progressive award value,
      (iii) display the increased total award value, and
      (iv) determine whether the increased total award value is greater than or equal to the second, different predetermined trigger value.

21. The gaming system of claim 20, wherein the first predetermined trigger value is a startup value for the first progressive award value.

22. The gaming system of claim 20, wherein increasing the total award value based on the first progressive award value includes setting the total award value to the first progressive award value.

23. The gaming system of claim 20, wherein increasing the total award value based on the first progressive award value includes increasing the total award value by the first progressive award value.

24. The gaming device of claim 20, wherein when executed by the gaming device processor, the plurality of instructions cause the gaming device processor to provide the higher of the first progressive award value and the second progressive award value to without providing the lower of the first progressive award value and the second progressive award value if the total award value is greater than or equal to the second predetermined trigger value.

25. A method of operating a gaming system, said method comprising:
(a) causing a gaming system controller to manage a first progressive award value associated with a first predetermined trigger value and a second progressive award value associated with a second, different predetermined trigger value;
(b) for each play of a game, causing a gaming device in communication with the gaming system controller to:
  (i) set a total award value to an initial value;
  (ii) cause a display device to display the set total award value;
  (iii) cause the display device to display at least one of a plurality of symbols;
  (iv) determine any award value associated with the displayed symbols;
  (v) increase the total award value by any of said determined award values;
  (vi) determine if the total award value is greater than or equal to the first predetermined trigger value; and
  (vii) if the determination is that the total award value is greater than or equal to the first predetermined trigger value:
    (A) provide at least the first progressive award value,
    (B) automatically increase the total award value based on the first progressive award value,
    (C) cause the display device to display the total award value, and
    (D) determine whether the increased total award value is greater than or equal to the second predetermined trigger value; and
(c) if an actuation of a cashout button is received, causing the gaming device to cause an initiation of a payout associated with any credit balance displayed by the display device.

26. The method of claim 25, wherein the first predetermined trigger value is a startup value for the first progressive award value.

27. The method of claim 25, wherein increasing the total award value based on the first progressive award value includes setting the total award value to the first progressive award value.

28. The method of claim 25, wherein increasing the total award value based on the first progressive award value includes increasing the total award value by the first progressive award value.

29. The method of claim 25, which is provided through a data network.

30. The method of claim 29, wherein the data network is an internet.

31. The method of claim 25, further including providing the higher of the first progressive award value and the second progressive award value without providing the lower of the first progressive award value and the second progressive award value if the total award value is greater than or equal to the second predetermined trigger value.

\* \* \* \* \*

UNITED STATES PATENT AND TRADEMARK OFFICE
CERTIFICATE OF CORRECTION

PATENT NO. : 9,047,733 B2  
APPLICATION NO. : 11/557878  
DATED : June 2, 2015  
INVENTOR(S) : Ryan Cuddy et al.

Page 1 of 1

It is certified that error appears in the above-identified patent and that said Letters Patent is hereby corrected as shown below:

IN THE CLAIMS

In Claim 8, Column 37, Line 61, replace the first instance of "a" with --the--.
In Claim 16, Column 38, Line 49, replace "the" with --a--.
In Claim 16, Column 38, Line 51, replace "(e)" with --(d)--.
In Claim 17, Column 39, Line 11, replace "a" with --the--.
In Claim 20, Column 39, Line 51, before controller insert --the--.
In Claim 24, Column 40, Line 16, replace "device" with --system--.
In Claim 24, Column 40, Line 21, delete "to".

Signed and Sealed this
Twenty-third Day of February, 2016

Michelle K. Lee
*Director of the United States Patent and Trademark Office*